Feb. 6, 1934.  J. GOBIN, DIT DAUDÉ  1,945,892
RIVET SETTING MACHINE
Filed April 13, 1931   10 Sheets-Sheet 1

J. Gobin dit Daudé
INVENTOR

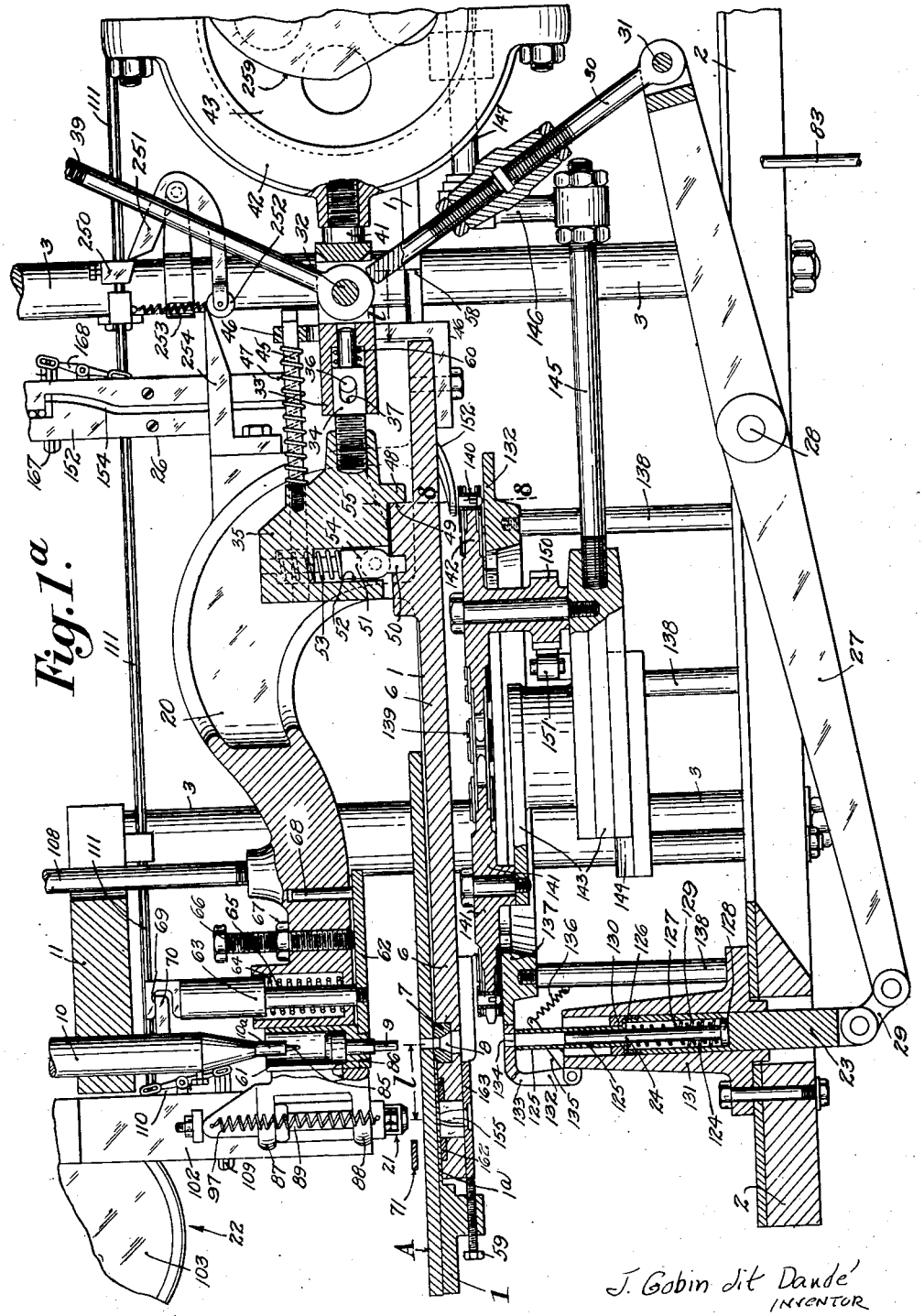

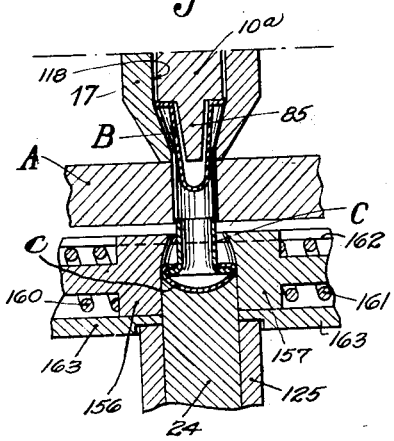
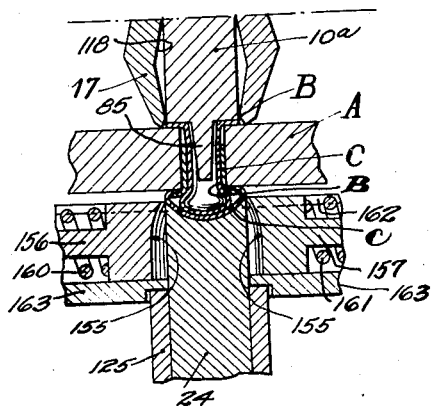
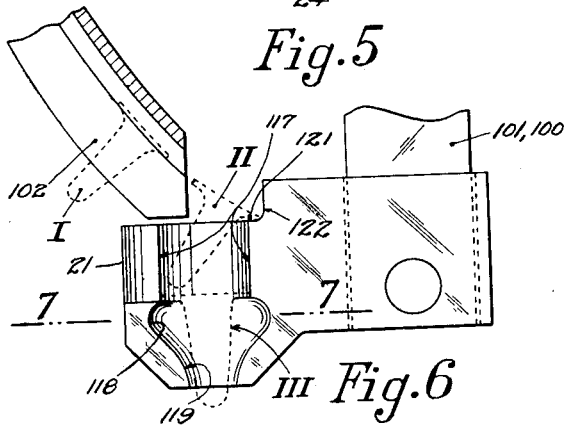
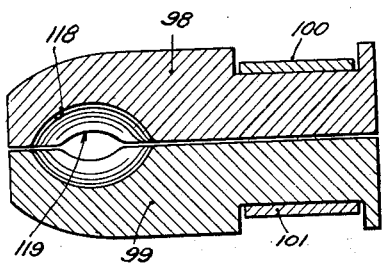
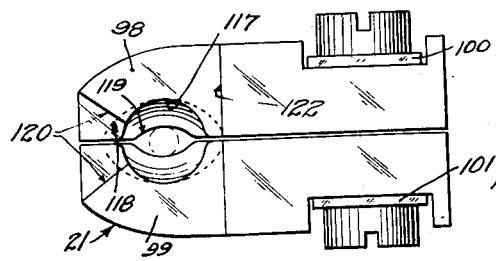
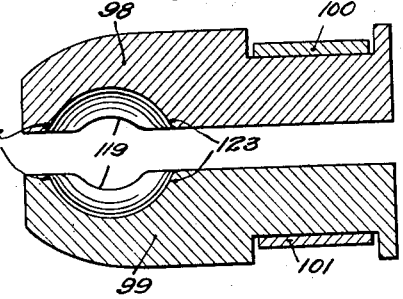

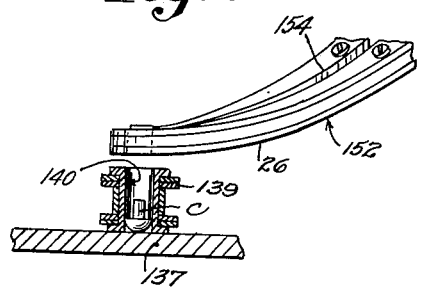
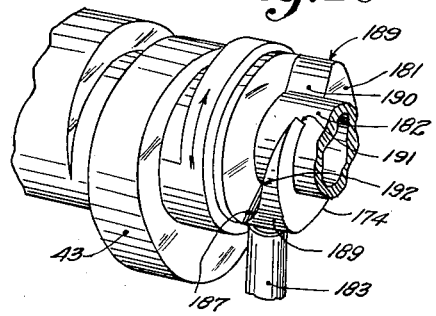
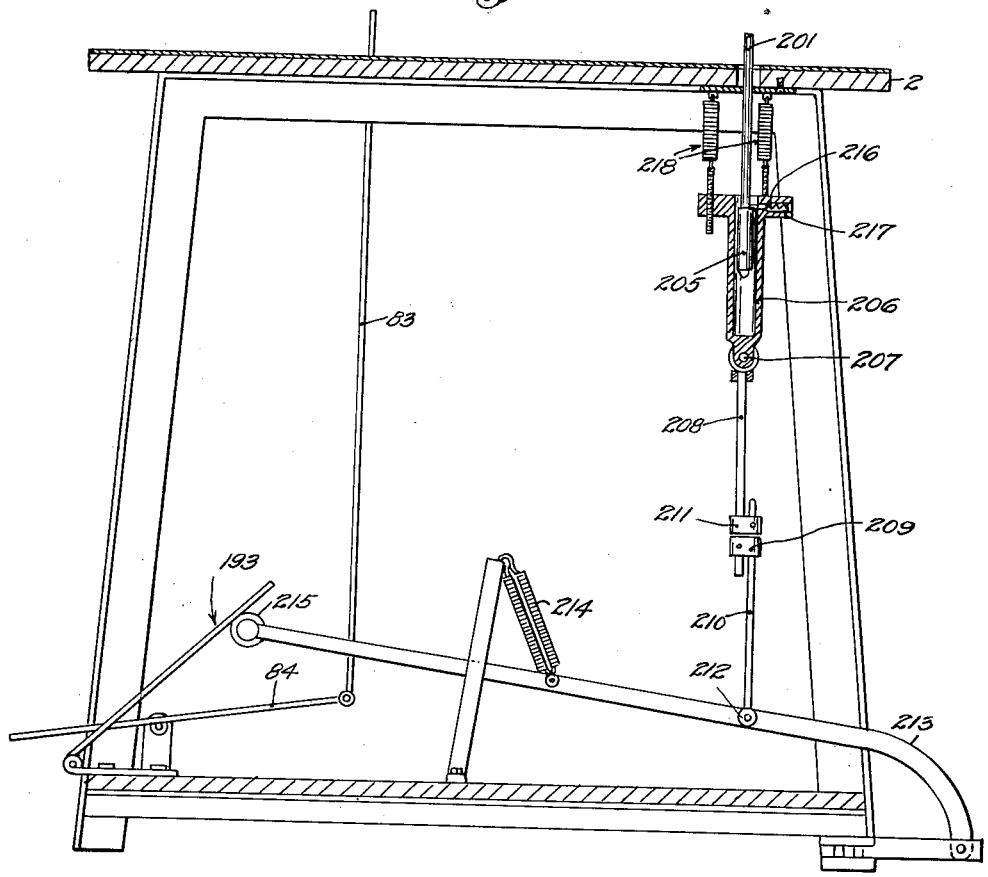

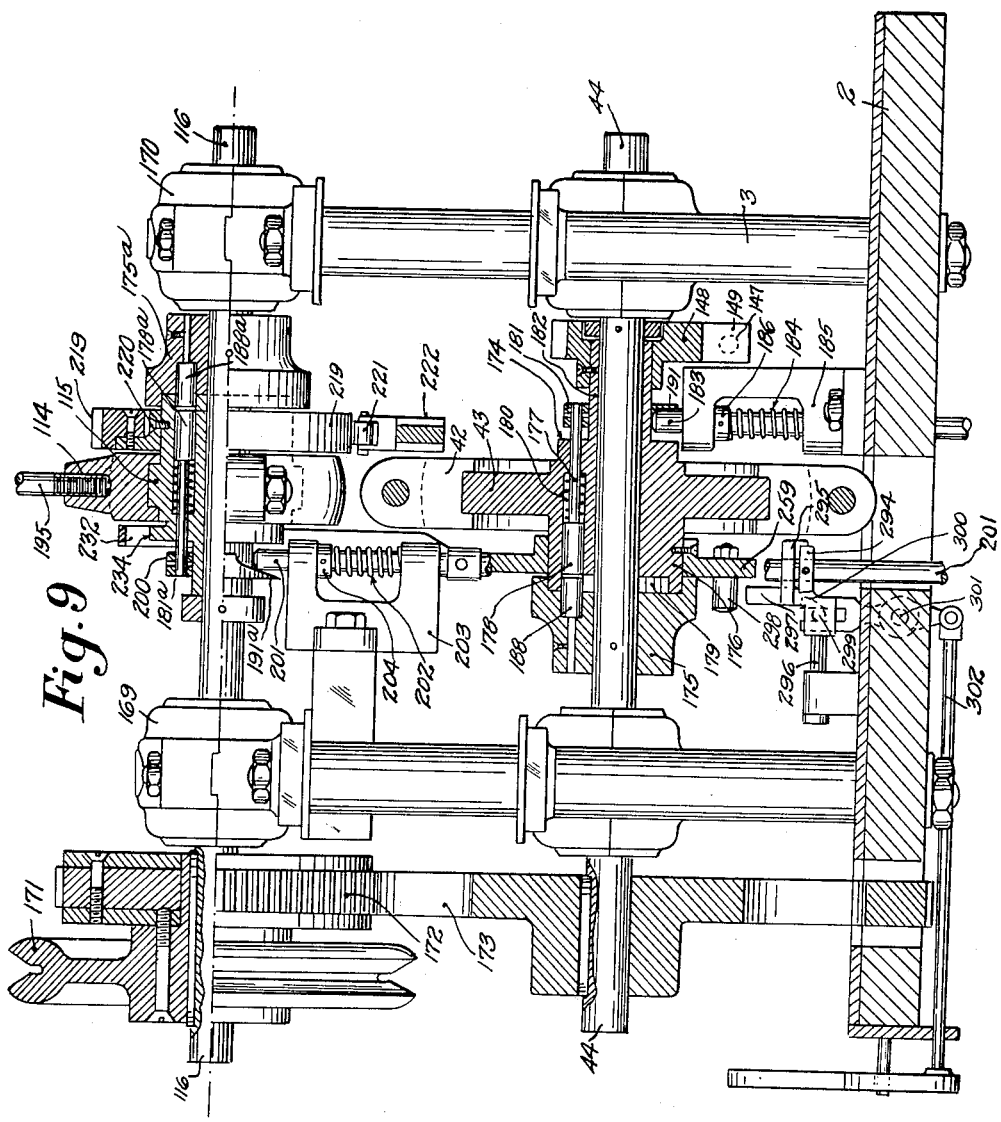

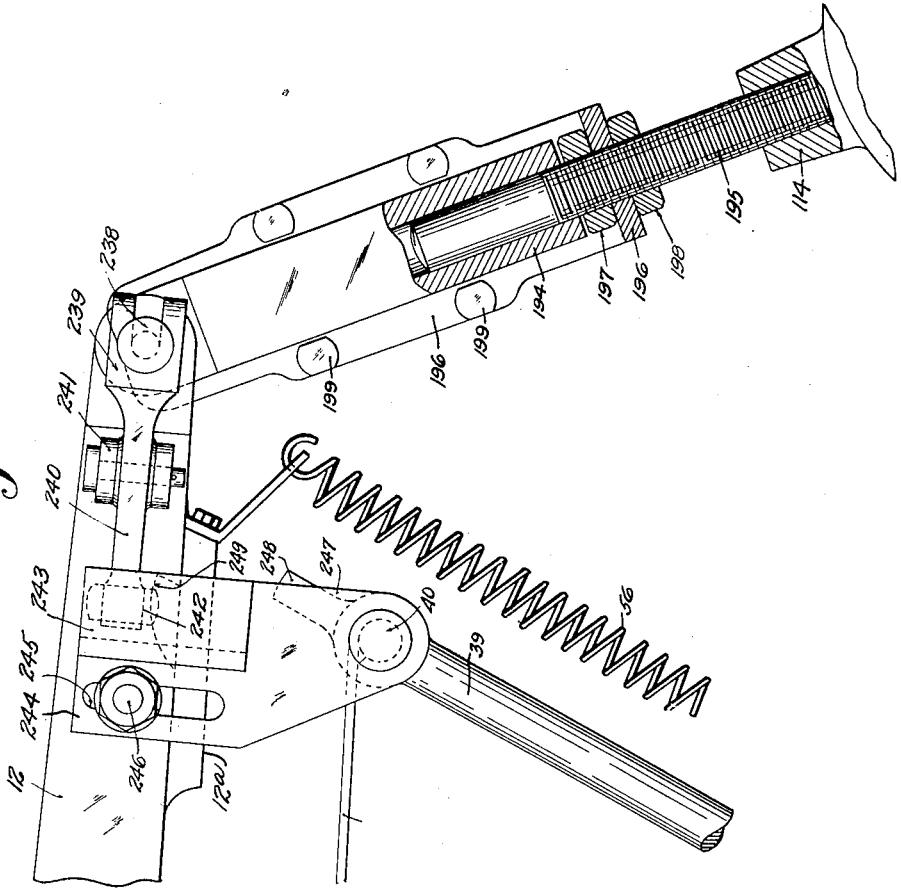

Feb. 6, 1934.   J. GOBIN, DIT DAUDÉ   1,945,892
RIVET SETTING MACHINE
Filed April 13, 1931   10 Sheets-Sheet 8
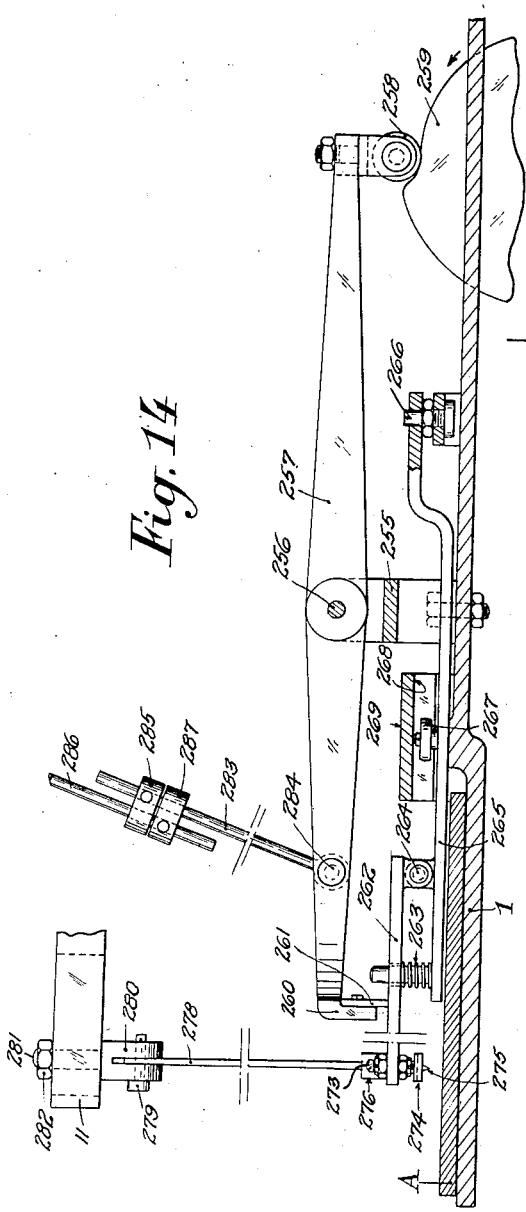
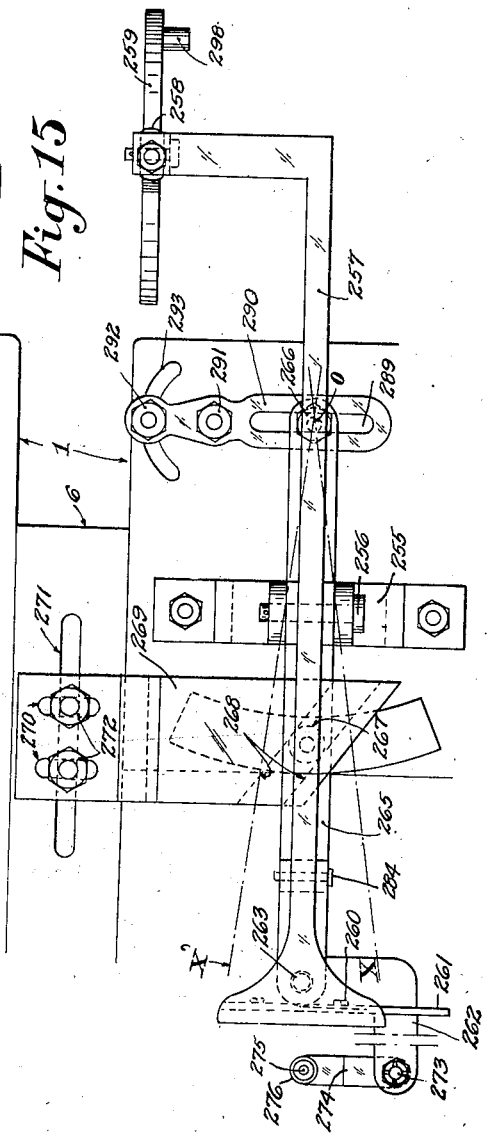
J. Gobin dit Daudé
INVENTOR Feb. 6, 1934.   J. GOBIN, DIT DAUDÉ   1,945,892
RIVET SETTING MACHINE
Filed April 13, 1931   10 Sheets-Sheet 9
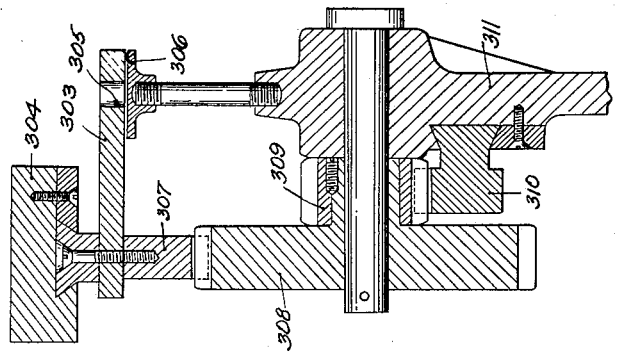
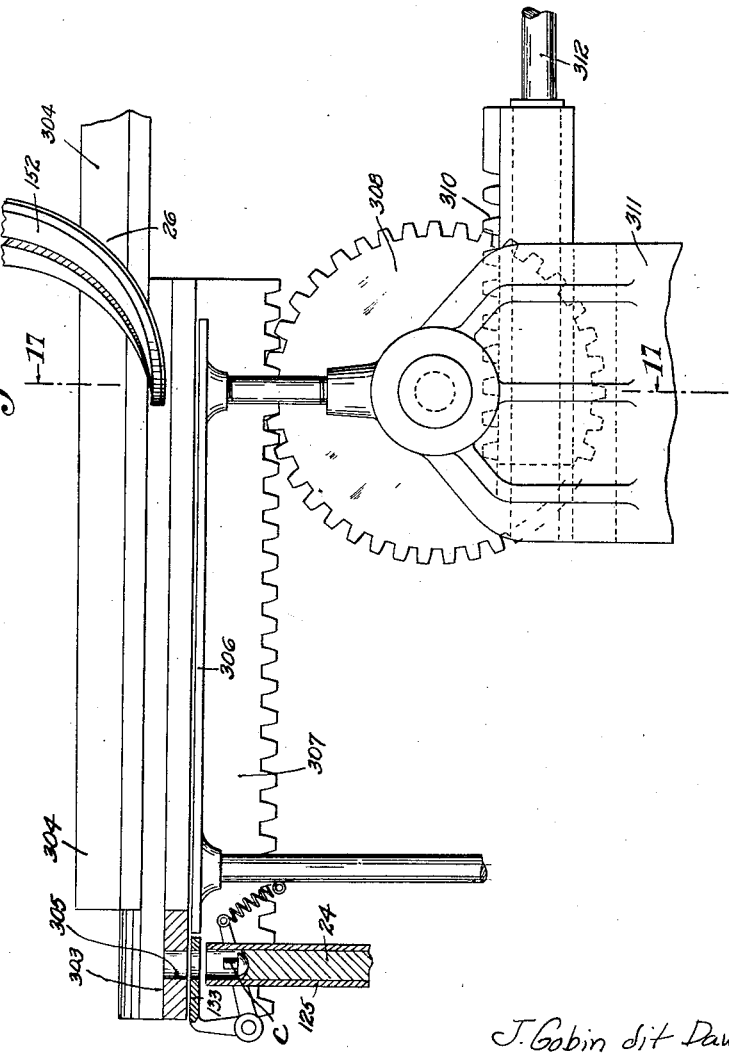
J. Gobin dit Daudé
INVENTOR Feb. 6, 1934.  J. GOBIN, DIT DAUDÉ  1,945,892
RIVET SETTING MACHINE
Filed April 13, 1931   10 Sheets-Sheet 10
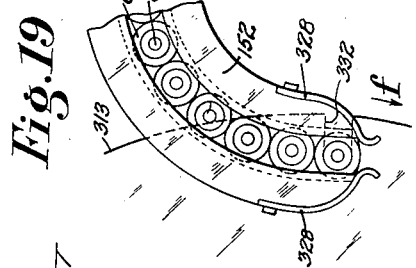
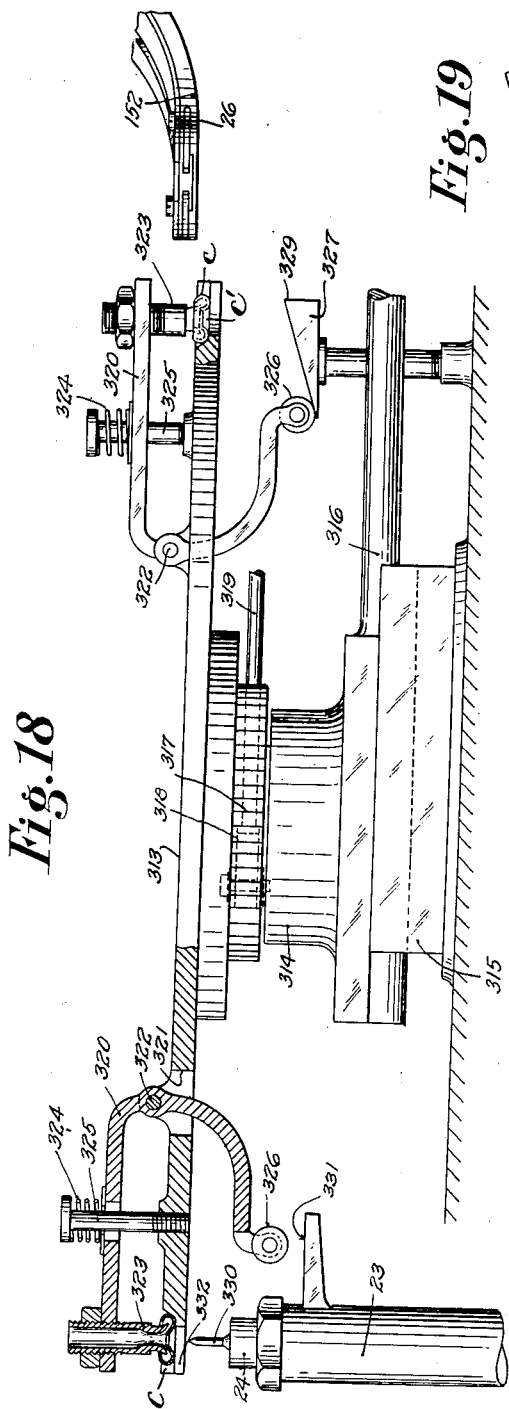
J. Gobin dit Daudé
INVENTOR
By Marks & Clerk
Attys.

Patented Feb. 6, 1934

1,945,892

UNITED STATES PATENT OFFICE 1,945,892

RIVET SETTING MACHINE

Jean Gobin, dit Daudé, Paris, France

Application April 13, 1931, Serial No. 529,814, and in France April 24, 1930

47 Claims. (Cl. 218—15)

My invention relates to an automatic machine for setting rivets made of one or two elements, which is so arranged as to perform the preliminary punching of the rivet hole; more generally the invention relates to any machine adapted to press two pieces against each other through a hole previously made by the machine in the work.

One object of my invention is to provide an automatic work feed device whereby the machine will be able to set a row of rivets at suitable intervals from each other.

Another object of my invention is to reduce to a minimum the momentum of the movable parts of the machine that are moved in order to pass from the punching position to the setting position.

Other objects of my invention are: to reduce the bulk of the machine, chiefly in the vertical direction; to arrange the parts of the machine in such manner that the distance between the row of rivets to be set and the edge of the work may be substantially increased; to provide a control of the automatic feeding of the rivets or rivet elements and of the setting operation in such manner that these operations will take place only if a hole has been previously made in the work; to provide positive connections between the hammer and its driving mechanism, operative when said hammer assumes its lowermost position, in engagement with the setting or punching tools, in order to always ensure a sufficient lift of the hammer to clear the way to the punching and setting tools, when moving from one position to another; to improve the shape of the spring jaws in which the rivet elements are engaged by the rivet set or the anvil during the setting operation; to provide an improved control for the punching and setting tools so as to secure a reliable operation and to provide means whereby the operation of the machine may be made continuous or discontinuous, at the will of the operator; to provide a machine adapted to operate upon various kinds of rivets and having feeding means especially adapted thereto; and to provide a machine adapted to set several rows of rivets simultaneously.

Further objects of my invention will be apparent from the following description, with reference to the accompanying drawings, in which is illustrated, by way of example, a preferred embodiment of my invention. In these drawings:

Fig. 1 is a longitudinal vertical section of the upper part of a machine according to my invention.

Fig. 1a is an enlarged view of a part of Fig. 1.

Figs. 2 and 3 are diagrammatic views illustrating two steps of the setting operation.

Fig. 5 is an enlarged view of one of the upper spring-jaws, showing the lower end of the upper rivet feeding raceway.

Fig. 6 is a corresponding plan view.

Figure 4:
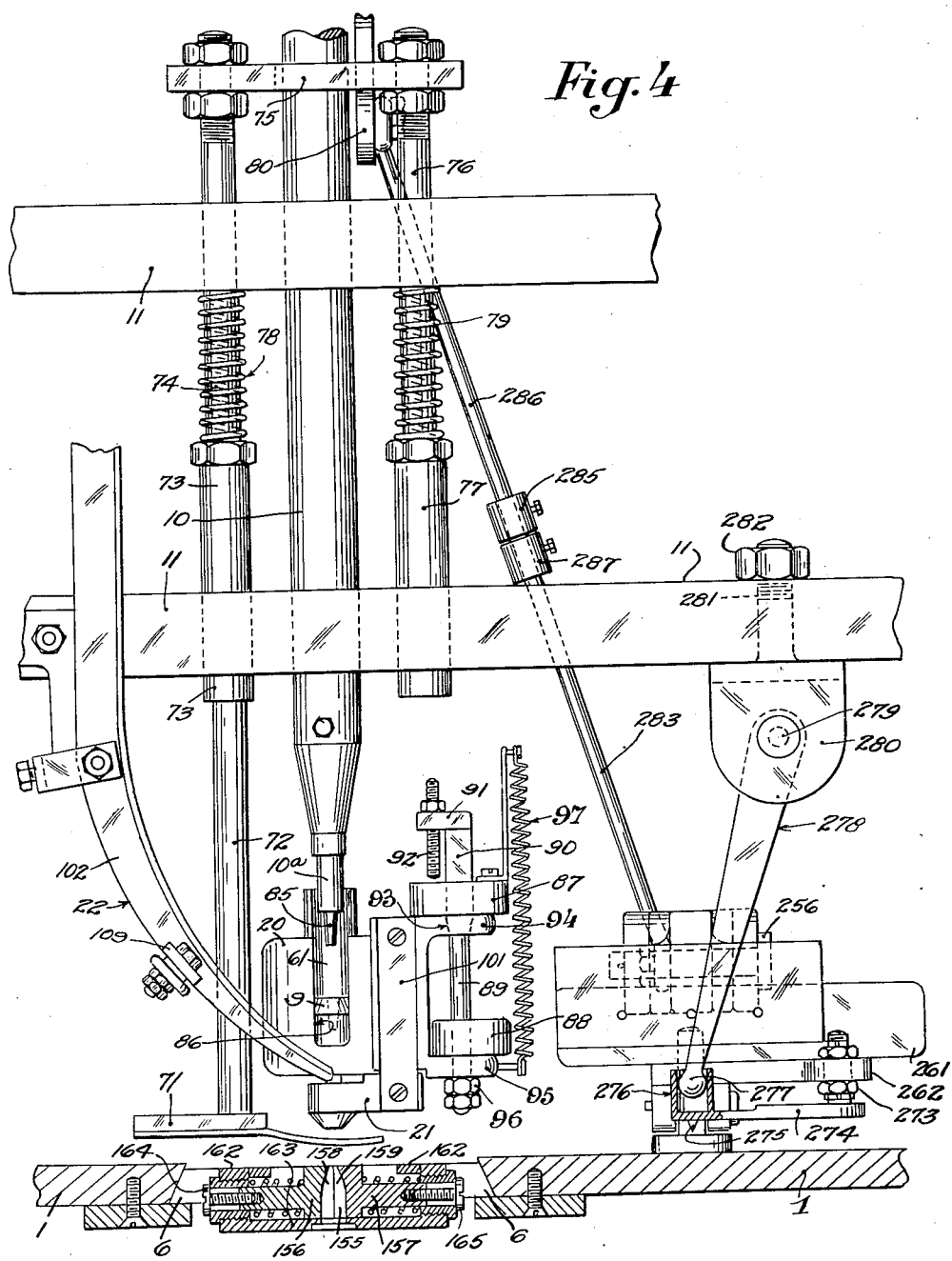
Fig. 4 is a partial front view of the machine, the lower spring-jaws being shown in section.

Figs. 7 and 7a are sectional views on the line 7—7 of Fig. 5, corresponding respectively to the position of Fig. 2 and to a position intermediate between those of Figs. 2 and 3.

Fig. 8 is a section on the line 8—8 of Fig. 1a.

Fig. 9 is a section substantially on the line 9—9 of Fig. 1.

Fig. 10 is a perspective view of an automatic clutch.

Fig. 11 is an elevational view of the lower part of the machine, with the control members located below those shown in Fig. 1.

Fig. 12 is an enlarged elevational view along line 12—12 of Fig. 1.

Fig. 13 is a side view corresponding to Fig. 12.

Fig. 14 is an elevational view of the work feed device.

Fig. 15 is a plan view corresponding to Fig. 14.

Fig. 16 is an elevational view, partly in section, showing a modification of the conveyor associated with the lower rivet-feed device.

Fig. 17 is a sectional view on the line 17—17 of Fig. 16, the conveyor bar being shown in a different position.

Fig. 18 is a sectional view of a still further embodiment of the conveyor, and

Fig. 19 is a partial plan view corresponding to Fig. 18.

In the following description, it has been assumed that the machine is adapted for setting metallic tubular rivets made of two parts or elements B and C (Figs. 2 and 3). The male part B consists of a slightly conical stamped tube closed at one end and having a flanged base at the opposite end. The female part C consists of a slightly conical tube open at both ends, the larger end having a flange and a cap c clenched thereon. These two parts are adapted to be forced into each other during the setting operation and the closed rounded end of the male part is caused to spread within the cap c of part C as a result of the pressure applied to these parts, as shown in Fig. 3.

General arrangement of the machine

My machine comprises a frame consisting, for instance, of a horizontal table 1 connected with a suitable plate 2 (Fig. 1a or 11) so as to stand at the level of the hands of an operator, seated in front of the machine; it further comprises several uprights 3 (Figs. 1, 1a) connected at their upper ends through longitudinal upper bars 4 and cross bars 5 (Fig. 1). In the plane of stationary table 1 is slidably mounted a movable table 6 (see Figs. 1, 1a and 4). Table 6 is provided in its front part with a die 7, the hole 8 of said die being adapted to register with a perforating punch 9 at the time of punching out the rivet hole.

A hammer or plunger 10, disposed above table 6, is slidable in guides 11, carried by uprights 3, and is connected through a shackle 10b to a horizontal lever 12 pivoted at 13 to one of the cross bars 5. A roller 14, carried by an arm 15, which is pivoted at 16 on the frame, engages lever 12 and serves to depress the latter when the hand lever 17, at the end of arm 15, is actuated by the operator. A stop 18 is adapted to limit, at rest, the upward movement of said arm 15 under the action of a spring 19.

A perforating punch 9, disposed under hammer 10 (Fig. 1a), is carried by a bracket 20 mounted on movable table 6, in such manner that the axis of punch 9 registers with the axis of the die hole 8. Bracket 20 also carries spring-jaws 21 associated with an upper rivet-feed mechanism 22 (Fig. 4) adapted to feed the male parts B of the rivets to said spring-jaws.

A movable anvil-holder 23 is disposed below table 6 in the axis of hammer 10. The anvil 24 of said anvil-holder is adapted to cooperate at the proper time with a conveyor 25 adapted to transfer the female parts C of the rivets from the lower rivet-feed device 26 to the anvil.

A lever 27, pivoted to the frame at 28, is connected with anvil-holder 23 through a shackle 29, and is connected at its other end to a toggle arm 30 of adjustable length, through a pin 31. Said toggle arm 30 is pivoted at 32 to a hollow guide member 33 adapted to guide a slide rod 34 screwed in a block 35, located above movable table 6. A stud 36, secured to guide member 33, engages an elongated slots 37 provided in slide rod 34.

To upper lever 12 (Fig. 1) is secured one end of an articulated lever 38 whose opposite end 40 is pivoted to a toggle arm 39 of adjustable length; the other end of toggle arm 39 is pivoted at 32 to guide member 33 (Fig. 1a). Said member 33 is pivoted at 32 to a fork 41, screwed in the strap 42 of an eccentric 43, mounted on a shaft 44 (Fig. 1). Said shaft is actuated by any suitable control means, for instance a cranked handle, or, as hereinafter described, by a power control.

It will be seen that the rotation of shaft 44 and eccentric 43 produces a reciprocating motion of guide member 33, slide rod 41 and block 35. Said block is first moved toward the right from the position shown in Fig. 1. Simultaneously, toggle arms 30—39 tend to be straightened, thus moving points 31 and 40 in opposite directions, which results in the hammer 10 being lowered and anvil-holder 23 being raised. During this movement, spring 19 keeps arm 15 in its raised position.

One or two rods 45 (Fig. 1a) are screwed in block 35 so as to slide freely through corresponding holes provided in an angular member 46 secured to movable table 6. A spring 47, surrounding rod 45, urges block 35 to the left with respect to table 6, which is provided with a shoulder 49 adapted to cooperate with a shoulder 48 of block 35.

Block 35 further carries a latch 50 integral with a plunger 51 adapted to reciprocate in a cylinder 52 provided in block 35. Said plunger is biased downwardly by a spring 53. Latch 50, which is adapted to engage a hole of movable table 6, is provided with two lateral rollers 54, adapted to ride on stationary inclined cam surfaces 55 of stationary table 1, on either side of movable table 6.

General operation of the machine

In order to punch out the work A in which rivets are to be set, table 6 being in the position shown in Fig. 1, the hand lever 17 for the manual control of hammer 10 is lowered by the operator, whereby hammer 10 engages the perforating punch 9, which cooperates with the hole 8 of the die 7, so as to punch out a hole in work A.

When the punching operation is completed, hand lever 17 is released and hammer 10 is raised by a spring 56 connecting lever 12 with toggle arm 39 through a piece 57, whereupon shaft 44 is set in motion, thus lowering hammer 10 and simultaneously raising anvil-holder 23.

In the meanwhile, guide member 33 is moved toward the right by the eccentric strap 42 and, through stud 36, rod 34, block 35, and latch 50, movable table 6 is shifted to the right. Just before movable table 6 comes into contact with a stop shoulder 58 of table 1 located in the path of table 6, rollers 54, rolling up along stationary cam surfaces 55, lift latch 50 from its hole in table 6. From this time on, table 6 is disconnected from its driving block 35, and it is then pressed toward the right against stop shoulder 58 by springs 47, which are slightly compressed when the machine is being assembled. At the time of table 6 coming into contact with stop 58, it has moved a distance $l$ equal to the distance between the axes of spring jaws 21 and of perforating punch 9. Table 6 then assumes the setting position.

During this movement of table 6, the work A is held stationary on table 1 by a presser foot and cooperating bridge member, as hereinafter explained.

The eccentric 43 is such that table 6 reaches its setting position before the end of the stroke of guide member 33, hammer 10 and anvil-holder 23, and it is maintained in that position during the whole time that is required for the setting operation, because table 6 is then applied against stop shoulder 58 under the increasing action of spring 47, as block 35 still moves to the right together with guide member 33. As movable table 6 was moving toward the setting position, die 7 also moved to the right, away from the hole made in work A, and jaws 21 have been substituted for punch 9 under hammer 10. In its downward motion, the lower end 10a of said hammer, forming a rivet set, presses on the base of a rivet male element B contained in spring jaws 21 and delivered by the upper rivet-feed device 22 (Fig. 4) and it drives said male element B into the hole made in work A. Simultaneously, the rising anvil-holder 23 has caught a female rivet element C delivered by the lower rivet feed device 26 and conveyer 25 (as will be hereinafter described) and brought said rivet element C below the hole made in work A; the setting operation is then performed in the manner hereinafter described, by a continued motion of the rivet set 10a and anvil 24.

When the rivet elements have been assembled, as shown in Fig. 3, continued rotation of shaft 44 moves hammer 10 and anvil-holder 23 away from work A, table 6 remaining applied against stop 58 under the action of spring 47 during the first part of the back stroke of guide member 33. Said part of the stroke corresponds to the extraction of the rivet set 10a of hammer 10 from jaws 21. Then, as guide member 33 keeps moving toward the left, the stop shoulder 48 of block 35 meets the stop shoulder 49 of table 6. Table 6 is driven toward the left until it engages an adjustable stop screw 59 mounted below stationary table 1. Movable table 6 has then resumed its initial position, latch 50 having dropped into its hole in table 6 before the end of the back stroke of table 6.

The eccentricity and the angular setting of eccentric 43 are such that guide member 33 will still move a little further toward the left after movable table 6 has stopped, a spring 60, interposed between guide member 33 and slide rod 34 absorbing the excess stroke (owing to the play of stud 36 in slot 37) and applying table 6 against its adjustable stop 59 with a certain pressure, which is desirable in order to ensure perfect registering of the axes of punch 9 and hammer 10, preparatory to the next punching operation.

From the foregoing, it will be seen that my machine is so devised as to punch out in the work A the hole that has to receive the rivet, and then, without the work A being displaced, hammer 10 cooperates with the spring jaws 21, which have been substituted for the perforating punch 9 above said hole, and with the anvil 24, in order to perform the setting operation, exactly in the axis of the hole, the tools carried by movable table 6 remaining in a fixed position during the whole time that is necessary for the setting operation.

Punching device

Punch 9 is guided along the axis of hammer 10 in a sleeve 61, adapted to slide in bracket 20, secured to movable table 6. A flange of punch 9 rests on the bottom of sleeve 61, which is screwed in a plate 62, provided with a plunger 63, adapted to move in a cylinder 64, integral with bracket 20. A spring 65 urges plate 62 against the lower end of an adjustable screw 66, provided with a lock-nut 67. Plate 62 is further guided by a stud 68.

At its upper end, plunger 63 is provided with a fork 69, adapted to cooperate with a lug 70 secured to hammer 10.

Presser foot (Fig. 4)

During the punching and setting operations, the work A is maintained in a fixed position on a bridge member 1a of stationary table 1, overhanging movable table 6. Said bridge member is visible in Fig. 1a, but it is not visible in Fig. 4, because it is located forwardly of the plane of the figure. The holding pressure is afforded by a presser foot 71 (Fig. 4), secured to the lower end of a vertical rod 72 extended by a tube 73, guided in lower guide 11, and in which is screwed a rod 74 guided in the upper guide 11 and secured to a yoke 75. Another rod 76 secured to yoke 75 is guided in upper guide 11 and screwed in a guide tube 77. If need be, tube 77 may be connected to a second presser foot through a bent rod clearing the setting tools carried by bracket 20. Springs 78 and 79, interposed between the upper guide 11 and tubes 73, 77 bias presser foot 71 against the work A; a lever 80 (Fig. 1) pivoted at 81 to the frame, and pivoted at 82 to a link 83 connected to a treadle 84 (Fig. 11) engages below yoke 75 and is adapted to raise presser foot 71 against the action of springs 78, 79 when treadle 84 is depressed by the operator.

Punching operation

The parts assuming the position shown in Fig. 1, the operator lowers hammer 10 through lever 17. Lug 70, through fork 69, lowers plunger 63 and plate 62, while punch 9, meeting the work A, is stopped and is thereafter submitted to the pressure of the lower end 10a of hammer 10. In the example shown, the hammer is provided with a teat 85, the function of which will be hereinafter indicated, and which engages a corresponding recess in punch 9. Punch 9 cooperates with hole 8, with which it has remained concentric notwithstanding its relative upward motion with respect to its carrier when meeting the work, owing to the guiding action of sleeve 61. The small disc of material punched out in the work enters the die hole 8, whence it is discharged during the next punching operations.

Setting device

Bracket 20 is formed at its front end with a strap 87, 88, through which extends a rod 89 (see Figs. 1, 1a and 4). The upper square portion 90 of said rod fits in a square aperture of bracket 87, the square fit preventing its rotation. Rod 90 ends in a bracket 91 carrying an adjustable stop screw 92. The square and rounded parts of rod 90 are connected together by a conical portion 93, adapted to be locked in a conical recess of a bracket 94 integral with spring jaws 21.

The pressure that ensures that wedging effect is obtained through the pressure, against another bracket 95, also integral with jaws 21, of a nut 96 screwed on the lower end of rod 89. Bracket 94 and 95 are applied against brackets 87 and 88 respectively by a spring 97 connected with brackets 87 and 95.

Screw 92 is so adjusted as to prevent the jaws 21 from engaging the work A and hence from scratching or injuring the same, when said jaws are lowered under the action of the hammer 10, as hereinafter explained.

Spring jaws 21 (Figs. 5 to 7a) have complementary recesses which form together a substantially conical hollow chamber, the two jaw members 98 and 99 being respectively supported by spring blades 100—101, carried by bracket 94—95.

Spring jaws 21 are located under the lower end of the raceway 102 of the upper rivet feed device 22. Said device being of a usual type, it does not appear necessary to describe the same in detail. It is reminded that it essentially comprises a conical receptacle 103 (Fig. 1) having a horizontal axis 104 and to which is given a stepwise rotary motion under the action of a ratchet crank 105, actuated by a connecting rod 106 pivoted at 107 to a rod 108 screwed in bracket 20. Receptacle 103 is provided on its larger diameter wall, with apertures (not shown) through which the male rivet elements B pass into raceway 102 along which they are conveyed to jaws 21. It should be noted that the upper rivet feed device is secured to the frame in an adjustable manner by means of bolts 103a extending through slots 103b of a flange 103c connected with receptacle 103.

Setting device

Bracket 20 is formed at its front end with a strap 87, 88, through which extends a rod 89 (see Figs. 1, 1a and 4). The upper square portion 90 of said rod fits in a square aperture of bracket 87, the square fit preventing its rotation. Rod 90 ends in a bracket 91 carrying an adjustable stop screw 92. The square and rounded parts of rod 89 are connected together by a conical portion 93, adapted to be locked in a conical recess of a bracket 94 integral with spring jaws 21.

The pressure that ensures that wedging effect is obtained through the pressure, against another bracket 95, also integral with jaws 21, of a nut 96 screwed on the lower end of rod 89. Brackets 94 and 95 are applied against brackets 87 and 88 respectively by a spring 97 connected with brackets 87 and 95.

Screw 92 is so adjusted as to prevent the jaws 21 from engaging the work A and hence from scratching or injuring the same, when said jaws as lowered under the action of the hammer 10, as hereinafter explained.

Spring jaws 21 (Figs. 5 to 7a) have complementary recesses which form together a substantially conical hollow chamber, the two jaw members 98 and 99 being respectively supported by spring blades 100—101, carried by bracket 94—95.

Spring jaws 21 are located under the lower end of the raceway 102 of the upper rivet feed device 22. Said device being of a usual type, it does not appear necessary to describe the same in detail. It is reminded that it essentially comprises a conical receptacle 103 (Fig. 1) having a horizontal axis 104 and to which is given a stepwise rotary motion under the action of a ratchet crank 105, actuated by a connecting rod 106 pivoted at 107 to a rod 108 screwed in bracket 20. Receptacle 103 is provided on its larger diameter wall, with apertures (not shown) through which the male rivet elements B pass into raceway 102 along which they are conveyed to jaws 21. It should be noted that the upper rivet feed device is secured to the frame in an adjustable manner by means of bolts 103a extending through slots 103b of a flange 103c connected with receptacle 103.

Due to this arrangement, the lower end of raceway 102 (Fig. 4) may be adjusted vertically, with respect to spring jaws 21. Inasmuch as the lower position of the latter may be also adjusted by means of screw 92, it will be seen that the position of the whole upper rivet feed device may be made to accommodate the thickness of the work and corresponding length of the tubular portion of rivet elements B.

A sliding distributor 109 (Fig. 1a) controlling raceway 102 is connected through a lever 110 to a rod 111 having a curved end 112 (Fig. 1) adapted to meet with a finger 113 rigidly secured to the strap 114 of an eccentric 115, mounted on a shaft 116. Rod 111 has a collar 111a engaged by a spring 111b, abutting against a fixed guide 111c, whereby rod 111 is urged by the spring toward the right. Thus, at each revolution of eccentric 115, to rod 111 and distributor 109 is given a reciprocating motion whereby one rivet element B will pass into the jaws 21 at each reciprocation of the distributor. On account of the rigid attachment of the feed device 22 to the stationary frame, a male rivet element can be fed to the jaws 21 only during the punching operation, since it is only at that time that jaws 21, movable with table 6, register with the stationary feed raceway 102. Thus, no rivet can be fed to the jaws 21 if the work is not punched, prior to setting, because eccentric 115 is adapted to control the automatic punching hereinafter described.

The shape of the recess of the jaws (see Figs. 5 to 7a) comprises a bore 117, an enlarged chamber 118 and a narrow throat 119. When the jaw elements 98, 99 are in contact (Figs. 6 and 7), the bore 117 has a circular section, chamber 118 has a substantially elliptical section formed of two circular arcs symmetrically disposed with respect to their common chord, and the throat 119 has a similar section (the edges being rounded off).

The rivet element B falls by gravity from raceway 102 (position I), its lower end passing through a notch 120; its flange then strikes a horizontal shoulder 121 and a vertical shoulder 122 (position II); the shock tilts the rivet element into a vertical position and said element slides down between the jaws 98, 99, its flange being guided in the cylindrical bore 117 and its lower end engaging throat 119, until its lower end projects slightly from the lower face of the jaws, and is stopped (position III); at this stage, the flange of element B is located at the level of the line connecting cylindrical bore 117 which chamber 118; the width of said chamber, in a direction at right angles to a common plane of contact of the two elements 98 and 99 (Fig. 5), gradually decreases from that line toward the throat.

When hammer 10 is being lowered under the action of toggle arm 39, the teat 85 of the hammer penetrates into male element B, while the lower annular plane face of the rivet set 10a presses said element B through the jaws. Jaws 21, together with brackets 94—95 (Fig. 4) are slightly lowered, against the action of spring 97, until screw 92 comes into contact with bracket 87. Rivet set 10a then drives the rivet element B into the substantially conical passage 118 of jaws 21 (thus moving the two jaws 98, 99 apart from each other against the action of springs 100, 101), and then into the hole of work A, until the flange of element B comes into contact with the upper face of work A. This position corresponds to the end of the downward stroke of hammer 10. The walls of chamber 118 have a curvature equal to that of the flange of rivet element B, so that said flange is perfectly guided by the walls of chamber 118 and does not risk of being scratched or wedged, while said element B is being driven down.

Preferably, the edges 123 are rounded off for the same purpose.

The lower anvil-holder 23 comprises a tube 124 in which is fitted the anvil 24 (Fig. 1a). Said anvil is surrounded by a tube 125 provided with a flange 126 against which bears a spring 127 the other end of which rests on a shoulder 128 provided on anvil 24. Another spring 129 concentric with spring 127, but shorter and stronger than the latter, also rests on said shoulder 128. Tube 125 and anvil 24 are held in position by a cap 130, screwed on the anvil-holder 23, which is guided in a slide 131, secured to plate 2. An arm 132, pivoted to slide 131, carries a small plate 133, provided with a hole 134, and is rigidly connected to a lever 135 urged by a spring 136 to normally apply plate 133 against guide-tube 125: in the first part of the upward stroke of anvil-holder 23, spring 136 is adapted to withstand the force of spring 127, which is progressively compressed. When the action of spring 129 is added to that of spring 127, spring 136 is adapted to yield, and plate 133 is accordingly tilted toward the left by tube 125.

A platform 137 is disposed adjacent anvil-holder 23, at the level of plate 133. Said platform is provided with a central aperture and is supported by upright 138. On the upper face of said platform is disposed a chain 139 the links of which are connected together by hollow pins 140; said chain passes over two sprockets 141 and 142, mounted loose on their spindles, which latter are supported by a carriage 143, adapted to reciprocate horizontally in stationary guides 144. Platform 137 is provided in its front part with a recess adapted to be exactly filled by plate 133, thus affording a continuous surface around hole 134.

A rod 145, screwed in carriage 143, is secured in an adjustable manner to a member 146, connected to the end of a rod 147 (Fig. 1), fixed to a push piece 148 engaging a quick cam 149, integral with eccentric 43. Rotation of cam 149 moves carriage 143 in its guides 144, and produces a reciprocation of the whole structure, including sprockets 141, 142 and chain 139, along platform 137, the length of which is such that the parts may be moved from the position shown in Fig. 1a to a foremost position to the left, in which a hollow axis 140 is concentric with hole 134 of plate 133, and vice-versa. This reciprocation takes place during the above mentioned first part of the upward movement of anvil-holder 23.

Besides its rectilinear reciprocation, chain 139 is given an angular movement, through rotation of pinion 142, integral with a ratchet wheel 150, adapted to cooperate with a pawl 151. Said pawl may be actuated by one of the driving shafts of the machine; preferably, and as shown in Fig. 1a, it is pivoted to a stationary part, so as to rotate wheel 150 during one stroke of carriage 143 (toward the right or the left).

Due to the arrangement of conveyor 25 between the anvil 24 and the raceway 152 of the lower feeding device 26, the distance through which work A may be inserted in the machine without being stopped by raceway 152 (that is to say the distance between the edge of the work and the row of rivets to be set) may be considerably increased. Raceway 152 is connected, in the same manner as for the upper feed device 22, with a conical receptacle 153 of any known type.

The lower rivet feed takes place as follows: after a rivet element C has fallen into a hollow pin 140 of the chain 139, said chain is moved with carriage 143 until an opposite hollow pin 140, previously provided with a rivet element C, registers with hole 134. During the return stroke of carriage 143, the chain is fed by sprocket 142 through one pitch, i. e. the distance between two adjacent hollow pins 140 so as to substitute an empty hollow pin for the hollow pin precedently fed with a rivet element below the groove 154 of raceway 152, whereby a hollow pin 140 supplied with a rivet element C is ready to come next in register with hole 134.

Each rivet element C thus falls by gravity through guiding hole 134 into guide-tube 125, with its heavier part, i. e. its cap c in contact with the upper face of anvil 24, which has a suitable shape for accommodating the shape of the cap c.

When anvil-holder 23 is moving upwardly, a rivet element C is fed into guide-tube 125 during the first part of this upward movement; the conveyor is then retracted, and, during the second part of said movement, plate 133 is tilted toward the left against the action of spring 136, guide tube 125 passing through the recess of platform 137 that was filled by said plate 133.

At that time, as above explained, movable table 6 has reached the setting position, so that jaws 21 are now aligned with hammer 10. Furthermore, die 7 has been replaced by lower spring jaws 155, and has been moved toward the right, adapted to set the rivet element C upright if it has not fallen in the correct upright position on the upper face of anvil 24.

Said lower spring jaws (Figs. 1 to 4) consist of two jaw members 156 and 157 provided with complementary recesses 158 and 159 and which are adapted to be moved apart against the action of springs 160, 161. The recesses form together a chamber having a shape similar to that of the chamber in the upper spring jaws (as described with reference to Figs. 5 to 7a). Lower jaw members 156, 157 are guided laterally in movable table 6, between an upper plate 162 and a lower plate 163. Their idle position is determined by stops 164, 165 (Fig. 4) by which the axis of spring jaws 155 always registers with the axis of spring jaws 21, even if one of the springs 160, 161 is stronger than the other.

As shown in Fig. 1a, the female parts C of the rivets are delivered one by one to the groove 154 of the raceway 152 of the lower feed device 26 under the action of a sliding member 167, actuated by a lever 168, pivoted to rod 111; each rivet element C thus delivered slides down by gravity along groove 154 and falls into a hollow pin 140 of chain 139 when the latter is in the position of Fig. 1, or 1a.

When the hole 8 of die 7 is so located as to register with the axis of hammer 10, the lower spring jaws are covered by the bridge member 1a, fixed to or integral with stationary table 1 and on which rests the work (the presser foot 71 advantageously having such a form that it presses the work on said bridge member).

*Setting operation*

The whole setting operation will now be clearly understood:

While hammer 10 is moving down, thus opening jaws 21 and driving a rivet element B into the hole of work A, anvil-holder 23 is raised together with anvil 24 on which rests a female rivet element C.

Conveyor 25 moves back, plate 133 is tilted toward the left and anvil 24 drives rivet element C through spring jaws 155 which set it upright if necessary (Fig. 2); tube 125 is now stopped in contact with plate 163, thus compressing the springs 127 and 129. Rivet element B, which is maintained in an upright position by jaws 21 and teat 85, engages the other element C of the rivet, which keeps moving upward with anvil 24 and is thus inserted between the walls of the hole punched out in work A and the outer surface of element B. Element C is thus forced over element B (Fig. 3), while the lower end of element B is spread or collapsed within cap c, which produces a strong assembly, the collapsed portion of element B being further concealed by the cap c of element C.

Power control of the setting operation

This machine may be operated automatically by suitable driving means (an electric motor for instance). Referring more particularly to Figs. 1 and 9, power is derived from the main driving shaft 116 of the machine, supported by suitable bearings 169, 170 provided on the frame of the machine; to said shaft is keyed a grooved driving pulley 171 coacting with a driving belt (not shown). Shaft 116 drives shaft 44 through meshing pinions 172 and 173. Mounted loose on shaft 44 is the above mentioned eccentric 43, connected to shaft 44 through an automatic clutch device 174. Said clutch comprises a coupling sleeve 175 keyed to shaft 44, adjacent the hub 176 of eccentric 43; in said hub 176 is arranged a plunger 177 whose head 178 is adapted to project into a recess 179 in coupling sleeve 175, under the action of spring 180. The outer end of plunger 177 is secured to a control member 181, adapted to slide on a cylindrical extension 182 of eccentric 43, and having the shape shown in Fig. 10. Said control member cooperates with a control rod 183 as will be hereinafter described.

As above described, the strap 42 of eccentric 43 controls the displacements of the setting tools of the machine, through toggle lever 30, 39, and I have denoted this eccentric as the "setting eccentric".

Automatic clutch device 174 is so devised as to limit the rotation of setting eccentric 43 to only one revolution, corresponding to a single reciprocation of movable table 6. For this purpose, control rod 183 is pushed in an upward direction by a spring 184, bearing at one end on a fixed support 185 and at the other end on a collar 186 of rod 183. Said rod is lowered at the proper time through a device that will be hereinafter described. Normally, rod 183, raised by spring 184, enters a gap between an inclined wall 187 of control member 181 and the hub 176 of eccentric 43; in that position of rod 183, member 181 is held toward the right (see Fig. 9) against the action of spring 180 and the head 178 of plunger 177 does not project in the recess 179, whereby eccentric 43 is disconnected from shaft 44.

When rod 183 is lowered, its upper end moves out of the gap above mentioned, so that control member 181 is urged toward the left by spring 180. Head 178 enters recess 179 of coupling sleeve 175, and engages a dog 188 of piece 175, thus connecting eccentric 43 with shaft 44. Control member 181 being also rotated, the end of rod 183 rides over the cylindrical part 189 of member 181 and, after a rotation of about three quarters of a revolution of member 181, rod 183 snaps along a substantially radial surface 190 under the action of spring 184; in other words, it moves upwardly so as to come into contact with the reduced extension 182 of eccentric 43.

As member 181 further rotates, rod 183 passes along the edge 191 of an oblique surface or snare 192 of member 181, and as said surface is inclined with respect to a plane at right angles to the axis of member 181, the latter is pushed toward the right, which disengages plunger head 178 from the dog 188 of coupling sleeve 175 and disconnects the eccentric 43 from shaft 44. The rotation of member 181 and eccentric 43 is stopped at the time where rod 183 is again at the end of the gap above described.

It will thus be seen that the automatic clutch device 174 disconnects eccentric 43 from its shaft after one revolution of said shaft.

Rod 183 can be lowered at will through a treadle. In the example shown, the machine is adapted to operate in a continuous automatic manner, and the lowering of that rod, which starts the setting operation, is produced automatically, after the punching operation, through an automatic controlling device which will be hereinafter described.

Power control of the punching operation

Instead of controlling the punching operation manually by means of lever 17, use may be made of a power drive under the control of treadle 193 (Fig. 11). For this purpose, the rear end of lever 12 (Figs. 1, 12 and 13) is pivoted to a slide member 194 in which is slidable a rod 195, screwed in the strap 114, above referred to, which surrounds the eccentric 115 mounted loose on shaft 116. An angle piece 196 (Fig. 12) is secured to rod 195 by means of nuts 197 and 198 and is provided with lugs 199 adapted to guide slide member 194.

Eccentric 115 is connected to shaft 116 (Fig. 9) through an automatic clutch device 200 which is identical with clutch device 174, (the parts bearing the same reference numerals, with the indicia a), and which is operated by a control rod 201 (similar to rod 183) actuated by a spring 202 bearing against a fixed support 203 at one end and against a collar 204 of rod 201 at the other end. Rod 201 is connected to treadle 193 through a device hereinafter described. When said treadle is depressed, rod 201 is lowered, thus coupling eccentric 115 with shaft 116 during one revolution of the latter, and producing a reciprocation of rod 195 (Fig. 13), the nut 197 of said rod engaging slide member 194 which moves lever 12 so as to produce the punching operation, in the same manner as if handle 17 (Fig. 1) were operated by hand.

Since eccentric 115 controls the power operation of the hammer 10 in the punching operation, it is referred to as the "punching eccentric".

The connection between treadle 193 and rod 201 is the following (Fig. 11): Rod 201 is provided with an enlarged portion 205, adapted to slide in a cylinder 206 pivoted at 207 to a rod 208 having an eye 209 through which slides a rod 210. Said rod 210 also has an eye 211 through which slides rod 208, and is pivoted at 212 to a lever 213 urged upwardly by a spring 214 and carrying a roller 215 engaged by treadle 193. A spring finger 216, adapted to slide in a plate 217, integral with cylinder 206 and connected to the stationary frame through springs 218, bears against rod 201.

When the operator depresses treadle 193, he lowers cylinder 206. Spring finger 216 of plate 217 causes the downward movement of rod 201, which results in coupling the punching eccentric 115 with shaft 116 and starting the punching operation. Said operation is performed with a great speed owing to the great gear ratio of gear wheels 172—173. By further depressing the treadle 193, spring 202 being compressed to a maximum, rod 201 cannot further move down and spring finger 216 slides over the enlarged portion 205 of rod 201; owing to spring 202 (Fig. 9), the extra depressing of treadle 193 will not prevent rod 201 from moving up to the required position for ensuring the disengagement of eccentric 115 after one revolution of shaft 116.

When the treadle is released, springs 218 (Fig. 11) raise cylinder 206 and enable finger 216 to come back to its initial position.

It will thus be seen that the punching operation is started by merely depressing treadle 193.

*Interconnection between the punching and setting control mechanisms*

The following device affords an automatic connection whereby the setting operation will automatically follow a punching operation. A cam 219 (Fig. 9) is secured to punching eccentric 115 by means of a screw 220, and cooperates with a roller 221 carried by a strap 222 secured to an arm 223 (Fig. 1) pivoted at 224 to a crank lever 225, the latter being pivoted at 226 to a bar 227, which is secured to the frame of the machine.

The pivot pin 224 is disposed at one side of members 223, 225, so that the downward motion of arm 223 with respect to lever 225 is prevented and downward thrust is transmitted to lever 225, whereas arm 223 may freely turn upwardly with respect to lever 225. The lower arm 228 of lever 225 is provided at its end with forks engaging rollers 229 carried by clutch control rod 183. Said arm 228 is urged upwardly by a spring 230 attached to a bracket 231 and which completes the action of spring 184.

The shape and arrangement of cam 219 is such that it produces the automatic clutching of setting eccentric 43 through lowering of clutch control rod 183 against the action of springs 230 and 184 (Fig. 9), owing to the rotation of lever 225, just before punching eccentric 115 is uncoupled from its shaft 116, when nut 197 is moving away from slide member 194, that is to say when the punching operation is completed. The oscillation of lever 225 is so limited that, after setting eccentric 43 is clutched, control rod 183 of eccentric 43 is free to move upwardly before said eccentric has completed one revolution, whereby rotation of the latter will in any event be limited to one single revolution.

If it is desired to use the machine as a mere punching machine, roller 221 may be moved out of the path of cam 219 by tilting arm 223 in a clockwise direction about axis 224.

With the arrangement above described, setting cannot be performed unless a previous punching operation of the work has taken place, which constitutes a valuable safety device and prevents damaging the machine and the work.

As above explained, the unclutching of punching accentric 115 is caused by the expansion of spring 202 (Fig. 9), which moves rod 201 in an upward direction. But if the operator depresses treadle 193 (Fig. 11) too slowly, eccentric 115 is liable to perform more than one revolution. In such case, the downward motion of hammer 10, produced by the second revolution of punching eccentric 115, might possibly not be synchronous with the movement that would be imparted thereto, together with the setting tools, if eccentric 43 (the rotation of which has been produced, as above described, in an automatic manner, through lever 225, at the end of the first revolution of the punching eccentric) acted alone.

In order to obviate this drawback, a stirrup 232 (Figs. 1 and 9) secured to control rod 201, is adapted to cooperate with a cam 233 integral with eccentric 115 and having a boss 234 adapted to positively raise rod 201 through stirrup 232 when the widest part 189 (Fig. 10) of control member 181 has moved past the end of rod 183, thus allowing the latter to move in an upward direction. In that manner, I ensure with absolute safety the automatic unclutching of eccentric 115 after one revolution.

*Locking devices*

It may happen that punch 9 be jammed in the hole it has punched out in such manner that the combined action of springs 65 (Fig. 1a) and 56 (Fig. 1) will not be sufficient for extracting said punch. In the next back stroke of movable table 6, the latter is liable to injure the machine or the work.

To obviate this drawback, in the case of power punching under the action of eccentric 115, a positive connection is provided between lever 12, which operates the hammer, and angle piece 196 (Figs. 12, 13) which is secured to eccentric strap 114.

For this purpose, angle piece 196 is provided in its upper part with an eye 235, which, when nut 197 comes into contact with slide member 194, registers with the axis of the pivot pin 236 which connects slide member 194 to lever 12. Said pivot pin is hollow and is adapted to receive a sliding pin 237, provided at its end with a grooved pulley 238 in which is engaged a fork 239 of a lever 240, pivoted at 241 on lever 12, and the other end of which is provided with a roller 242, cooperating with a cam groove 243 of an angular member 244 pivoted at 40 to toggle arm 39. Said angular member 244 has a slot 245 in which is slidable a guiding screw 246, screwed in lever 12.

During the setting operation, the end of toggle arm 39 is constantly bearing against the boss 12a of lever 12, urged downwardly by spring 56, and roller 242 remains in the lower part of groove 243. In this position, pin 237 is maintained toward the left hand side of Fig. 12 and does not extend through eye 235, which, by the way, does not register with pivot 236.

During power controlled punching operation, nut 197 raises slide member 194 and lever 12, while toggle arm 39 and angular member 244 remain in a fixed position. Roller 242 therefore moves upwardly along cam groove 243, and lever 240 pushes pin 237 into eye 235, which at that time, on account of the contact between nut 197 and member 194, registers with hollow pivot pin 236. Once the punching operation is completed, angle piece 196 is moved downwardly and owing to the locking action of pin 237, it positively raises the hammer 10, thus disengaging punch 9 from the hole in which it may possibly be jammed through the medium of stud 70, fork 69, plate 62 and sleeve 61.

Shortly before nut 197 recedes from slide member 194, roller 242, moving down in its cam groove 243, has again rotated lever 240 in a direction such as to retract pin 237, so that angle member 196 can be further moved down, while lever 12 stops when its boss 12a engages toggle arm 39.

The length of pin 237 and the shape of the cam groove 243 are such that, when hammer 10 is moved by hand in a downward direction, so as to punch out, to centre, or to mark a hole, pin 237 does not project from pivot 236 until it has moved past the upper end of angle piece 196, above eye 235.

Same as there may be jamming during the punching operation, teat 85 of hammer 10 may be jammed during the setting operation, due to possible shrinking of the male rivet element during setting. Spring 56 may then be insufficient for causing the upward motion of hammer 10, after setting.

In order to obviate this drawback, I provide a positive connection, at the end of the downward stroke of hammer 10 corresponding to a setting operation, between lever 12 and link 39, and, for that purpose, I take advantage of the fact that, in the action of toggle arm 39 on lever 12, the angle made by these two pieces increases from the upper position of hammer 10, reaches a maximum value at the end of the downward stroke of the hammer, and diminishes afterwards when the hammer moves upwardly.

As shown in Fig. 13, link 39 is extended by a locking member 247, inwardly bent at 248, and lever 12 has a lateral sector-shaped boss 249. In Fig. 13, link 39 is shown in the position corresponding to the end of the upward stroke of hammer 10 after setting, and the angle made by lever 12 and link 39 is minimum.

Locking member 247 is disengaged and away from boss 249, as shown, and the rear end of lever 12 has been freely raised by the punching control members. When punching is completed, the rear end of lever 12 moves down, and when hammer 10 is fully raised (see Fig. 1), the rear boss 12a of said lever rests on the end of toggle arm 39. At this stage, the setting operation starts, due to the straightening of toggle arms 30, 39. During the setting operation, toggle arm 39 assumes a more vertical position and pivots about axis 40, in an anti-clockwise direction and inasmuch as sector boss 249 is now at a smaller distance from axis 40 than the bent portion 248 of locking member 247, due to the contact of boss 12a with the end of toggle arm 39, locking member 248 will catch over boss 249, thus positively connecting lever 12 and link 39 during a sufficient part of the stroke of the hammer to ensure disengagement of teat 85 if the latter is jammed within a rivet part B.

If it is desired to use the machine for punching without setting rivets, care must be taken to avoid feeding of rivet parts B, C at each punching operation, inasmuch as these punching operations are not followed by setting operations. To this effect, the rod 111 for controlling the sliding distributors (Figs. 1, 1a) is provided with a stop 250 which, on the displacement of rod 111 toward the left, passes over a locking lever 251, the lower end of which, provided with a roller 252, is applied by a spring 253 against the inclined surface of a cam member 254 secured to movable table 6.

When there is no setting operation after punching, table 6 remains in a fixed foremost position, and locking lever 251 engages stop 250, so that rod 111 is held to the left and distributors 109 and 167 are held to the right by spring 111b, after one distribution of rivet elements has been performed. In this position, the curved end 112 is almost clear of finger 113, that is, the stroke of rod 111 toward the right is so small that no rivet feed can take place. On the contrary, when there is a setting operation, movable table 6 moves toward the right and lowers roller 252, which releases stop 250 whereby rod 111 can perform its full return stroke to the right and cause a new supply of rivet elements for the following operation.

In that way I avoid accumulation of rivet elements in jaws 21 and on the conveyor 25.

*Automatic work feeding device, (Figs. 4, 14 and 15)*

A bracket 255 (Fig. 14) secured to stationary table 1 serves to support the pivot pin 256 of a lever 257, substantially parallel with the direction of displacement of movable table 6. The righthand end of said lever is provided with a roller 258 adapted to run on a cam 259 rigid with the setting eccentric 43 (Figs. 1 and 9), while the opposite end of said lever is bent at 260 and carries an adjustable blade 261. An arm 262 is applied against said blade in an upward direction by a spring 263. Said arm is pivotally mounted on an axis 264 which is carried, together with said spring 263, by a lever 265 pivotally mounted on stationary pivot pin 266 and carrying a roller 267 guided in a groove 268 of a plate 269.

Said plate 269 is mounted in adjustable position on movable table 6, owing to its grooves 270 and to the groove 271 of the table, said grooves being traversed by securing bolts 272.

At the front end of lever 262 is pivoted on a screw 273 an arm 274 provided at its free end with a driving point 275 above which is disposed a hollow cylinder 276 in which is engaged a ball 277 (Fig. 4) provided at the lower end of a lever 278. Said lever 278 is pivoted at 279 on a support 280 adapted to rotate about an axis 281 mounted on stationary bar 11 in adjustable position along a groove parallel with the direction of displacement of movable table 6. Said support 280 is locked in position on said bar after adjustment by means of a nut 282.

A rod 283 is pivoted at 284 to lever 257. Said rod is provided with a sleeve 285 provided with a passage for a rod 286, also provided with a sleeve 287. These sleeves bear against each other and serve to connect rods 283 and 286 during the downward stroke of the forward end (at the left in Fig. 14) of lever 257. Rod 286 is pivoted at 288 (Fig. 1) on lever 80 which serves to raise presser foot 71.

During the punching operation, table 6 is at the end of its stroke toward the left and groove cam 268, which is movable with said table 6, acts on roller 267 to bring the centre line of lever 265 in the position OX (Fig. 15). Roller 258 is on the part of cam 259 which has the smallest radius, and point 275 is raised above the work. After the punching operation, during the back stroke of table 6 toward the right, roller 267 moves in groove 268 and the middle line of lever 265 is brought to the position OX'. While lever 265 is held stationary in that direction, roller 258 is raised by cam 259, which lowers blade 261, the latter in turn lowering arm 262 against the action of spring 263. Point 275 engages a hollow rivet precedingly set, or a hole punched out beforehand, by an acuation of handle 17 for example, and which is brought by hand under point 275.

As movable table 6 moves back toward the left, blade 261 remains lowered, while lever 265 passes from position OX' to position OX under the action of cam groove 268, movable with table 6, upon roller 267. The axis of screw 273 describes a circular arc about center O, but as lever 278 must oscillate in a vertical plane whose direction is determined by the adjustment of bracket 280, ball 277 describes a straight line which is the intersection of the above mentioned plane with a horizontal plane, thus guiding point 275 along said straight line, while arm 274 oscillates slightly about axis 273 to permit such movement.

The angular adjustment of support 280 thus determines the direction of feed of the work. At the same time as lever 257 presses through its blade 261 upon arm 262, it pulls on rods 283 and 286, thus raising presser foot 71 and releasing the work A. Said work is thus fed through a distance equal to the stroke of point 275, which is equal to the interval between successive rivets. At the end of the stroke of the driving point 275, arm 262 and lever 257 are rotated by spring 263 and cam 259 in a clockwise direction (Fig. 14) and springs 78 and 79 (Fig. 4) are operative to again apply the presser foot 71 against the work.

Driving point 275, due to this rotation of arm 262, is disengaged from the work, while lever 265 is stationary, because table 6, and hence lever 265 is stopped shortly before the end of the rotation of eccentric 43 and cam 259. This is due to the adjustment already described of stop screw 59, whereby the difference between the stroke of strap 42 of eccentric 43 and table 6 is absorbed by spring 60.

Pivot pin 266 is adjustably secured in a groove 289 of a holder 290, pivoted at 291 to table 1 and carrying a bolt 292 adapted to be locked in an adjustable position in an arcuate groove 293 of table 1. By adjusting the angular position of holder 290 and the position of pin 266 in its groove, the centre O may be accurately positioned. It will thus be seen that, due to this adjustment, together with the adjustment of bracket 280 and member 269, the amount and direction of motion of point 275 may be adjusted at will.

It should be noted that blade 261 is sufficiently wide to bear upon arm 262 of lever 265 within the whole range of displacements of the latter.

When the distance between two consecutive rivets of the same row is small with respect to the length of lever 265, the arc described by point 275 about centre O practically coincides with its chord. In that case, arm 274 may be rigidly secured to arm 262 and lever 278 may be eliminated.

When rivet elements B are closed with caps, it is not possible to use a driving point for feeding the work, and said point may be replaced for example by tongs of a known type, operated in any suitable manner by lever 257 so as to momentarily grasp and feed the work.

Continuous power drive

My machine comprises a mechanism through which, once a punching and a setting operation have been initiated by depressing treadle 193 (Fig. 11), the same operations are repeated indefinitely without necessitating any further attendance, the work being fed during each operative cycle by means of the mechanism that has just been described.

To this effect the control rod 201 (Figs. 1 and 9) of the clutch of the punching eccentric 115 is provided with a collar 294 on which a lever 295 rests by its own weight. Said lever 295 is pivoted at 296 to the frame and is provided with a nose 297 in the path of travel of a dog 298 secured to the side of cam 259 keyed to eccentric 43. Said dog is so disposed with respect to said eccentric that it meets nose 297 and causes the lowering of rod 201 shortly before the automatic unclutching of eccentric 43. Accordingly punching eccentric 115 is again coupled to shaft 116, which ensures a continuous operation of the machine.

The time which elapses between the lowering of rod 201 and the beginning of the rotation of eccentric 115 is a function of the angular distance between dog 188a (Fig. 9) and the plunger end 178a, at the time where the latter is moved to the right by the lowering of rod 201 under the action of dog 298. By designing a gear 173 whose radius is a multiple of the radius of gear 172, this angular distance will always have the same value, which will be so selected that the beginning of the rotation of eccentric 115 should be synchronous with the end of the rotation of eccentric 43.

If, on the contrary, it is desired to operate the machine in a discontinuous manner, by successively depressing treadle 193, nose 297 is moved away from the path of travel of dog 298 by displacing lever 295 along its axis 296. For this purpose, said lever is provided with a finger 299 engaging a fork 300 (Fig. 9) adapted to rotate about a fixed axis 301 and pivoted to a driving rod 302.

Practical applications of the machine

In the preceding description, it has been supposed that the machine is intended to set rivets made of two parts, of the type shown in Figs. 2 and 3. But my machine is adapted to be used for many other applications.

Thus, the male element B of the rivet might be provided with a cap clenched on its flange.

In some cases, it may be advantageous to use a rivet which, after setting, will leave an open hole through the work. Said rivet may be formed of a single piece and it is then an ordinary eyelet (like piece C assuming it is deprived of a cap), which may be fed in the present machine by means either of the upper feed device or of the lower feed device (my machine then operates as an eyelet setting machine).

Otherwise, said rivet may still be composed of a male and a female element. In that case, the male element has no cap or has a perforated cap and it is perforated or open at its narrow end, while the female element either has no cap, or has an open cap, or is even reduced to an open cap. Obviously the shapes of the rivet set and of the anvil will, in that case, be suitably modified. In particular, the anvil will be provided at its upper end with a needle, having a conical base, which, while ensuring distribution of the female element, will form a support for the cap so as to permit setting by flaring of the open end of the male element and to ensure the strength of the assembly.

My machine may also be provided with a plurality of punching and setting devices disposed in such manner that, for a given direction of feed of the work, they may ensure the simultaneous setting of parallel rows of rivets. By modifying the direction of feed of the work, the distance between two adjacent rows of rivets will thus be modified at will.

Modification of the conveyor for the lower rivet elements

In Figs. 16 and 17, I have shown a different embodiment of the conveyor for bringing female rivet elements C from the lower feed raceway 152 into the guide-tube 125 surrounding the anvil 24. In this example, the conveyor consists of a bar 303, which is guided in a dovetail guide of a stationary member 304, and is provided with a hole 305 which, during the displacement of bar 303, is closed at its lower end by a fixed table 306 (similar to platform 137 of Fig. 1a) extended by movable plate 133.

At the end of the displacement of bar 303 toward the right, hole 305 receives a female rivet element C from raceway 152. Bar 303 then moves toward the left, and hole 305 comes to register with the axis of the anvil; rivet element C falls into guide-tube 125; then bar 303 moves again toward the right in order to receive a new rivet element and to clear plate 133, which is tilted by the upward motion of guide-tube 125, during the second part of said motion, as it has been already explained.

Bar 303 may be driven by a rack 307, meshing with a pinion 308 integral with a small pinion 309 actuated by a rack 310 guided in support 311 and actuated by a rod 312 (similar to rod 145 of Fig. 1a).

In Figs. 18 and 19, I have shown another embodiment of a conveying device which can be utilized when female element C is perforated, or provided with a perforated cap, or reduced to a perforated cap (which latter case is that shown in the figures). c' denotes the hole of the rivet elements C.

The conveyor comprises a plate 313 pivotally mounted on a support 314 adapted to slide in a guide member 315 and driven through a rod 316, similar to rod 312 (Fig. 16) or 145 (Fig. 1a). Plate 313 is integral with a rachet wheel 317 actuated by a pawl 318 operated by a rod 319, which is connected in any suitable manner to a cam (not shown) integral with the setting eccentric 43.

Two or more U-shaped levers 320 extending through apertures 321 of plate 313 are pivotally mounted at 322 to said plate 313. Each of said levers is provided with a hollow teat 323 adapted to engage a female rivet element C and which presses the cap of that female element against plate 313 under the action of a spring 324 mounted on a rod 325.

The lower end of lever 320 carries a rollar 326 adapted to cooperate, below feed chute 152, with an inclined cam surface 327, so as to raise hollow teat 323 on the displacement of carriage 314 toward the right, until the axis of the teat registers with the female rivet element C that is located at the lower end of raceway 152 and, in this modification of raceway 152, is held in position by two springs 328. At that very moment, roller 326 snaps downwardly past the upper edges 329 of the inclined surface 327, so that hollow teat 323 engages rivet element C. Plate 313 then rotates in the direction of arrow f under the action of rod 319, and hollow teat 323 forces element C tangentially out of the springs 328.

Then, carriage 314 moves toward the left. When the teat 323 in consideration registers with the anvil 24, which, for that kind of rivets, is provided with a needle 330, plate 313 is stopped, while roller 326 of lever 320 occupies a position above a bracket 331 integral with anvil-holder 23. When the latter is raised, bracket 331 rotates lever 320, and hollow teat 323 moves out of element C, needle 330 having then already engaged said rivet element, because the leverages of the arms of lever 320 are such that, to a given displacement of bracket 331 and needle 330 in an upward direction, will correspond a greater displacement of hollow teat 323; thus teat 323 may be fully disengaged from needle 330 and plate 313 may have moved toward the right before the upper surface of anvil 24 has reached the level of the lower face of plate 313. Movement of carriage 314 toward the right disengages needle 330 from a radial slot 332. whose width is slightly smaller than the outer diameter of rivet element C, and slightly greater than the diameter of the needle. Needle 330 then fully engages rivet element C before reaching the setting position.

Levers 320 may be even in number; in that case, during the back stroke of plate 313 toward the right, the needle 330 of the anvil catches a rivet element C and produces setting and, simultaneously, a teat engages a rivet element C located in raceway 152 and clamps the same as soon as roller 326 has moved beyond the edge 329 of surface 327. Then, while lower anvil-holder 23 moves downwardly, plate 313 rotates and detaches a rivet element C from raceway 152, but the angle of said rotation should be just great enough in order that the roller 326 to the right (Fig. 18) should recede tangentially from inclined surface 327, so as to make possible the displacement of said roller 326 toward the left during the stroke of carriage 314 in that direction.

Said angle of rotation must be smaller than the angular distance between two consecutive rollers 326, because the next roller 326 to the right would come behind member 327 and prevent subsequent displacement of carriage 314 to the left. After such displacement has taken place, plate 313 is rotated through a further angle so as to bring an adjacent teat 332 exactly above the anvil-holder 23 and a roller 326 at the bottom of inclined surface 327.

While I have described what I deem to be preferred embodiments of my invention, it will be understood that I do not wish to be limited thereto as there might be changes made in the arrangement disposition and shape of the parts without departing from the principle of my invention, as comprehended within the scope of the appended claims.

For instance, the stationary table, the movable table and the die, instead of being plane, may be cylindrical, or have any other shape according to the shape of the work. Said table may be kept very narrow; it may be reduced, in width as well as in length, to the size of the pressure foot in the part of said table that is near the punching and setting tools. Table 6 might also be driven by a cam integral with the setting eccentric.

For the sake of brevity, in the following claims, the displacement of movable table 6 from the punching position to the setting position will be called "forward stroke", while its displacement in the opposite direction will be called "back stroke", but no absolute meaning should be attached to such expressions. Similarly, the term "stationary", as applied to the frame or to table 1, simply means that such parts are stationary with respect to the "movable" parts of the machine, but it is obvious that said stationary frame or table may be embodied in a movable structure.

Having now described my invention what I claim as new and desire to secure by Letters Patent is:

1. An automatic machine of the type described comprising in combination, a stationary frame, a stationary table adapted to support the work, a slidable table lying in the same plane as said table, a die carried by said slidable table and provided with a hole, a hammer slidably mounted on said frame, means for reciprocating said hammer in a direction at right angles to the plane of said table, a support integral with said slidable table, means carried by said support and operable by said hammer to engage the hole of the die through the work, holding means carried by said support for presenting a rivet element to said hammer, means for reciprocating said slidable table between two extreme positions, a first position in which the hole of the die is in line with the axis of the hammer, and a setting position in which the axis of said holding means is in line with the axis of the hammer, an anvil and an anvil-holder supported by said stationary frame under said table and in line with said hammer adapted to cooperate with said hammer during the setting operation.

2. An automatic machine of the type described comprising in combination: a stationary frame, a stationary table adapted to support the work, a slidable table lying in the same plane as said table, a die carried by said slidable table and provided with a hole, a hammer slidably mounted on said frame, means for reciprocating said hammer in a direction at right angles to the plane of said table, a support integral with said slidable table, a perforating punch carried by said support above the hole of the die, holding means carried by said support for presenting a rivet element to said hammer, means for reciprocating said slidable table between two extreme positions, a punching position in which the hole of the die is in line with the axis of the hammer, and a setting position in which the rivet element carried by the above mentioned holding means is in line with the axis of the hammer, an anvil and an anvil-holder supported by said stationary frame below said table and in line with said hammer adapted to cooperate with said hammer during the setting operation.

3. An automatic machine of the type described comprising in combination: a stationary frame, a stationary table adapted to support the work, a slidable table lying in the same plane as said stationary table, a die carried by said slidable table and provided with a hole, a hammer slidably mounted on said frame, means for reciprocating said hammer in a direction at right angles to the plane of said table, a support integral with said slidable table, a perforating punch carried by said support above the hole of the die, holding means carried by said support for presenting a rivet element to said hammer, means for feeding rivet elements to said holding means, means for reciprocating said slidable table between two extreme positions, a punching position in which the die hole is in line with the axis of the hammer, and a setting position in which the rivet element carried by the above mentioned holding means is in line with the axis of the hammer, an anvil, an anvil-holder supported by said stationary frame below said table and in line with said hammer adapted to cooperate with said hammer during the setting operation, and means for feeding complementary rivet elements to said anvil.

4. An automatic machine of the type described comprising in combination: a stationary frame, a stationary table adapted to support the work, a slidable table lying in the same plane as said stationary table, a die carried by said slidable table and provided with a hole, a hammer slidably mounted on said frame, means for reciprocating said hammer in a direction at right angles to the plane of said table, a support integral with said slidable table, a perforating punch carried by said support above the hole of the die, holding means carried by said support for presenting a rivet element to said hammer, driving means for reciprocating said slidable table, means for stopping said table in two extreme positions, a punching position in which the hole of the die is in line with the axis of the hammer, and a setting position in which the rivet element carried by the above mentioned holding means is in line with the axis of the hammer, an elastic connection between said driving means and said table, whereby the table is stopped in the punching position before the end of the corresponding stroke of said driving means, means for feeding rivet elements to said holding means, an anvil, and an anvil-holder supported by said stationary frame below said table and in line with said hammer adapted to cooperate with said hammer during the setting operation.

5. An automatic machine of the type described comprising in combination: a stationary frame, a stationary table adapted to support the work, a slidable table lying in the same plane as said stationary table, a die carried by said slidable table and provided with a hole, a hammer slidably mounted on said frame, means for reciprocating said hammer in a direction at right angles to the plane of said table, a support integral with said slidable table, a perforating punch carried by said support above the hole of the die, holding means carried by said support for presenting a rivet element to said hammer, driving means for reciprocating said slidable table, two stops on the stationary frame adapted to hold said slidable table in two extreme positions, a punching position in which the hole of the die is in line with the axis of the hammer, and a setting position in which said holding means registers with the axis of the hammer, a spring interposed between said driving means and said table, whereby the table is stopped in the setting position before the end of the forward stroke of said driving means, means for positively connecting said driving means with said table during its back stroke, a spring latch on said driving means for engaging said slidable table during the forward stroke thereof, and means for disengaging said latch from said table when the latter is near to its setting position.

6. A machine as claimed in claim 2, further comprising an eccentric, an eccentric strap on said eccentric, means for connecting said eccentric strap to said second mentioned reciprocating means, and a toggle lever whose apex is pivoted to said eccentric strap and whose opposite ends are connected with said hammer and with said anvil-holder, respectively.

7. An automatic machine of the type described comprising in combination: a stationary frame, a stationary table adapted to support the work, a slidable table lying substantially in the same plane as said table, a die carried by said slidable table, a rivet set slidably mounted in said frame, means for reciprocating said rivet set in a direction at right angles to the plane of said table, a support integral with said slidable table, means carried by said support in the axis of the die and operable to engage the work, holding means carried by said support for presenting a rivet element to said rivet set, means for reciprocating said slidable table between two extreme positions, a first position in which the axis of the die is in line with the axis of the rivet set, and a setting position in which the axis of said holding means is in line with the axis of the rivet set, and an anvil adapted to cooperate with said rivet set during the setting operation.

8. A machine as claimed in claim 2, further comprising a driving shaft, an eccentric mounted loose on said shaft, an eccentric strap on said eccentric, means for connecting said eccentric strap to said second mentioned reciprocating means a toggle lever whose apex is pivoted to said eccentric and whose opposite ends are connected with said hammer and said anvil-holder, respectively, a clutch between said shaft and said eccentric, and automatic means for releasing said clutch after one revolution of the eccentric.

9. In a rivet setting machine, a stationary frame, a movable frame, a punching tool carried by said movable frame, a hammer reciprocable in said stationary frame, an anvil in line with said hammer and reciprocable in said stationary frame, means for moving said movable frame to bring said punching tool into and out of register with said hammer and anvil, whereby said punching tool may be operated by said hammer to perform its punching function, means for actuating said hammer for the punching operation, separate means for actuating said hammer and anvil for the setting operation, and one-way non-positive connections between said hammer and both said actuating means.

10. An automatic machine of the type described, comprising in combination: a stationary frame, a stationary table adapted to support the work, a slidable table lying in the same plane as said stationary table, a die carried by said slidable table and provided with a hole, a hammer adapted to slide in said frame in a direction at right angles to the plane of said table, a support integral with said slidable table, a perforating punch carried by said support above the hole of the die, holding means carried by said support for presenting a rivet element to said hammer, driving means for reciprocating said slidable table between two extreme positions, a punching position in which the hole of the die is in line with the axis of the hammer, and a setting position in which the rivet element carried by the above mentioned holding means is in line with the axis of the hammer, an anvil, an anvil-holder located below said table adapted to guide said anvil in a direction at right angles to said table, a driving shaft, a setting eccentric mounted loose on said shaft, an eccentric strap on said eccentric, means for connecting said eccentric strap to said driving means, a toggle lever whose apex is pivoted to said eccentric strap for operating said hammer and said die-holder when the table is in the setting position, a setting clutch between said shaft and said eccentric, automatic means for releasing said clutch after one revolution of said eccentric, a punching shaft geared to the first mentioned one, a punching eccentric mounted loose on said shaft, means, operated by said punching eccentric for depressing said hammer when the table is in the punching position, a punching clutch between said punching shaft and said punching eccentric, and automatic means for releasing said punching clutch after one revolution of the punching eccentric.

11. A device as claimed in claim 2 further comprising a lower feed device, remote from the axis of said hammer, for supplying rivet elements to said anvil, and a conveyor between said feed device and said anvil-holder.

12. An automatic machine of the type described comprising in combination: a stationary frame, a stationary table adapted to support the work, a slidable table lying in the same plane as said table, a die carried by said slidable table and provided with a hole, a hammer slidably mounted in said frame, means for reciprocating said hammer in a direction at right angles to the plane of said table, a lug projecting from said hammer, a support integral with said slidable table, a perforating punch, a punch-holder slidably mounted in said support, a fork secured to said punch holder and extending to the level of the lug of the hammer, said punch registering with the hole of the die, holding means carried by said support for presenting a rivet element to said hammer, means for reciprocating said slidable table between two extreme positions, a punching position in which the hole of the die is in line with the axis of the hammer and the lug engages said fork, and a setting position in which the rivet element carried by the above mentioned holding means is in line with the axis of the hammer, an anvil and an anvil-holder, supported by said stationary frame below said table and in line with the hammer adapted to cooperate with said hammer during the setting operation.

13. An automatic machine according to claim 12, further comprising an adjustable stop on said support, elastic means adapted to urge said punch-holder against said stop, and means for adjusting the stroke of the hammer.

14. An automatic machine of the type described comprising in combination: a stationary frame, a stationary table adapted to support the work, a slidable table lying in the same plane as said table, a die carried by said slidable table and provided with a hole, a hammer slidably mounted on said frame, means for reciprocating said hammer in a direction at right angles to said table, a support integral with said slidable table, a perforating punch carried by said support above the hole of the die, two spring jaws adapted to present a rivet member to the hammer, a jaw carrying element adapted to slide on said support, an adjustable stop for limiting the downward movement of said member in accordance with the thickness of the work, means for reciprocating said slidable table between two extreme positions, a punching position in which the hole of the die is in line with the axis of the hammer, and a setting position in which the rivet element held by said jaws is in line with the axis of the hammer, an anvil and an anvil-holder, supported by said stationary frame below said table and in line with said hammer adapted to cooperate with said hammer during the setting operation.

15. In a rivet setting machine, a stationary frame, a movable frame, punching tools carried by and having parts axially guided in said movable frame, setting tools embodying a rivet set guided in said stationary frame, means for holding the work in a fixed position, means for actuating said movable frame, means for actuating said tools, and connecting and timing means for said actuating means, whereby said movable frame is moved relatively to the work to bring the axis of said punching tools in line with the axis of said rivet set in the punching position of said movable frame and to clear the way to said rivet set in the setting position of said movable frame.

16. An automatic machine of the type described comprising in combination: a stationary frame, a stationary table adapted to support the work, a slidable frame, a die carried by said slidable frame, setting tools embodying a hammer slidably mounted on said stationary frame, means for reciprocating said hammer in a direction at right angles to said slidable frame, a perforating punch carried by said slidable frame above the die, rivet feeding means embodying conveying means carried by said slidable frame for bringing a rivet element in the axis of said setting tools, means for reciprocating said slidable frame between two extreme positions, a punching position in which the die is in line with the axis of the hammer, and a setting position in which the rivet element carried by the above mentioned conveying means is in line with the axis of the hammer, and an anvil and an anvil-holder, supported by said stationary frame below said table and in line with said hammer, adapted to cooperate with said hammer during the setting operation.

17. An automatic machine according to claim 15 further comprising two spring jaws located below said movable frame and adapted to guide a lower rivet element.

18. In a rivet setting machine, a pair of spring jaws, comprising a support member, elastic members, two jaw members attached to said elastic members, said jaw members being hollowed out so as to form a bore, which, in the inoperative position, is substantially cylindrical, said bore being joined to a substantially elliptical chamber whose smaller diameter decreases from the bore toward the opposite end, and a restricted throat opposite said bore and having rounded edges.

19. An automatic machine of the type described comprising in combination: a rivet set, an anvil, a pair of upper spring jaws for presenting a rivet element to said rivet set, said jaws being hollowed out so as to form by their juxtaposition a bore, which, in the inoperative position, is substantially cylindrical, said bore being joined to a substantially elliptical chamber, whose smaller diameter decreases from the bore toward the opposite end, and a narrow neck for said chamber opposite said bore, said pair of upper jaws having a flat upper horizontal surface and a shoulder on said surface, a feed device, and a raceway leading from said feed device and so connected to said jaws, that the base of a rivet element fed to the jaws through said raceway strikes that shoulder, before falling into said cylindrical bore.

20. An automatic machine according to claim 14, further comprising a stationary rivet feed device, a fixed raceway leading from said feed device to said jaws and adapted to cooperate with said jaws in the punching position of said slidable table.

21. An automatic machine according to claim 14, further comprising a stationary rivet feed device, a fixed raceway leading from said feed device to said jaws and adapted to cooperate with said jaws in the punching position of said slidable table, a distributor for said feed device, eccentric means for operating said perforating punch, and means for driving said distributor from said eccentric.

22. In an automatic rivet setting machine, a lower anvil, an upper rivet set, means for moving said rivet set and said anvil toward and away from each other, a sliding guide-tube surrounding said anvil and yieldingly connected thereto, a pair of spring jaws cooperating with said anvil and means for supporting the work above said spring jaws, said guide-tube being adapted to butt against the lower surface of said jaws, in the movement of said anvil toward said rivet set by which said rivet element is forced by said anvil along said guide-tube and through said spring jaws.

23. In an automatic machine for setting rivets, a rivet set, an anvil, means for moving said rivet set and anvil toward and away from each other, a feed device for supplying rivet elements to said anvil, a conveyor between said feed device and said anvil, a stationary plane member for supporting said conveyor having a cut out part above the anvil, an extension plate pivoted to said stationary frame and provided with a hole coaxial with said anvil and yielding means for urging said extension plate into the plane of said plane member, so as to fill in said cut out part, said extension plate being adapted to be moved against the action of said yielding means in the movement of the anvil toward said rivet set.

24. An automatic machine according to claim 23, wherein said conveyor comprises a reciprocable member provided with spaced holes for receiving rivet elements from said feed device, the bottom of said holes being formed by said stationary plane member.

25. In a rivet setting machine, a stationary frame, a movable frame, punching tools embodying a perforating punch carried by said movable frame, setting tools embodying a rivet set guided in said stationary frame, means for holding the work in a fixed position, a power shaft, a mechanism embodying punching eccentric means and setting eccentric means for operating said movable frame and said tools, a punching clutch and a setting clutch, respectively interposed between said eccentric means and said power shaft, and automatic devices respectively associated with said clutches for releasing the respective clutch after one revolution thereof, said mechanism further embodying connecting and timing means between said eccentric means, whereby said movable frame is moved relatively to the work to bring the axis of said rivet set in the punching position of said movable frame and to clear the way to said rivet set in the setting position of said movable frame.

26. An automatic machine as claimed in claim 25, further comprising a feed device for supplying rivet elements to said setting tools, and a sliding distributor for said feed device operated by said punching eccentric means.

27. An automatic machine according to claim 9, wherein said first mentioned actuating means comprise a lever for operating the hammer to perform the punching operation, a slide member pivoted to said lever, a power driving member, a guide member for said slide member operatively connected with said power driving member and a one-way connection between said slide and guide members.

28. An automatic machine according to claim 25, further comprising a cam operatively connected with said punching eccentric means and adapted to operate the setting clutch releasing device, and a single control treadle for shifting in said punching clutch, whereby said setting clutch is automatically engaged upon one revolution of said punching eccentric means.

29. An automatic machine according to claim 25, further comprising a cam operatively connected with said punching eccentric means and adapted to operate the setting clutch releasing device, a rod for operating the punching clutch releasing device, a single control treadle for operating said rod to engage said punching clutch, whereby said setting clutch is automatically engaged after a predetermined rotation of said cam, another cam operatively connected with the punching eccentric means, and means on said rod cooperating with said last mentioned cam for bringing said rod to its releasing position before a complete revolution of the punching eccentric means.

30. In an automatic rivet setting machine, punching tools, setting tools, a power shaft, means including a clutch for connecting said shaft with said tools, means for releasing said clutch, manually operated means for moving said releasing means into the inoperative position and thereby causing the engagement of said clutch, a cam rotated by said shaft through said clutch, and a cam follower adapted to automatically restore said releasing means into their operative position, after a predetermined rotation of said shaft.

31. In a machine as claimed in claim 25, a dog rotatable with said setting eccentric means, and means on the path of said dog adapted to operate the punching clutch releasing device.

32. In a machine as claimed in claim 25, means associated with said setting eccentric means for controlling the punching clutch releasing device, a treadle for manually operating said punching clutch releasing device, and a cam member associated with said punching eccentric means for positively actuating said punching clutch releasing device after one revolution of said punching eccentric means.

33. An automatic machine according to claim 9, further comprising a lever between said hammer and said first-mentioned actuating means, automatic locking means for positively connecting said lever with said first mentioned actuating means during the first part of the upward stroke of the hammer, subsequent to the punching operation.

34. An automatic machine according to claim 10, further comprising a lever for operating the hammer, a slide member, a hollow pivot pin for connecting said lever to said slide member, a guide member for said slide member operatively connected with said last mentioned eccentric and provided with a hole, a one-way stop connection between said slide and guide members, a latch adapted to slide through said hollow pin and to engage said hole when said stop connection is operative, a roller on said lever for operating said latch, and a cam member on one toggle arm engaging said roller.

35. An automatic machine according to claim 9, further comprising a locking device between said hammer and said separate actuating means for positively connecting said hammer and said separate actuating means at the beginning of the return stroke of the hammer after the setting operation.

36. An automatic machine according to claim 10, further comprising a lever for operating the hammer, a boss on said lever, and a bent arm integral with the adjacent toggle arm adapted to catch with said boss when said arm engages said lever and when the angle that these latter make with each other is nearly maximum.

37. An automatic machine according to claim 25 further comprising upper and lower jaws, a rivet feed device for supplying rivet elements to said upper jaws, another feed device for supplying rivet elements to the lower jaws, a sliding distributor for each of said feed devices, a rod adapted to be actuated in one direction by the punching eccentric means, a spring for actuating said rod in the opposite direction, a stop for preventing the action of said spring and means operated by the movable frame when passing from the punching position to the setting position for moving said stop into its inoperative position.

38. A machine according to claim 2, further including an automatic work feed mechanism.

39. A machine according to claim 2, further comprising an automatic work feed mechanism adapted to feed the work during the back stroke of the slidable table.

40. In a rivet setting machine, a stationary frame, setting tools reciprocable in said frame, a movable table, punching tools carried by said table, a work-feed lever pivoted to said frame, means for actuating said feed lever, a work feeding point connected with said feed lever, a pressing pivotal lever adapted to depress said feed lever whereby said feeding point engages a rivet previously set in the work, a pressure foot adapted to resiliently press the work on the frame and means for connecting said pressing lever to said pressure foot in order to lift the latter from the work in the feeding stroke of said feed lever.

41. In a machine as claimed in claim 40, a small lever pivoted to said feed lever and carrying said feeding point, and means in the axis of said point for guiding the latter along a rectilinear path.

42. In a rivet setting machine, punching means, setting means, actuating means therefor, a clutch between said punching means and the actuating means therefor, means controlled by said setting means toward the end of their return stroke for clutching in said punching means, means for automatically clutching out said punching means toward the end of their return stroke, and means for automatically feeding the work past said punching and setting means.

43. In a machine for setting hollow rivets, a setting tool, a rivet feed device and a conveyor between both, comprising a plate, means for imparting to said plate a rotary motion and a reciprocating motion, a plurality of levers pivotally mounted on said plate, teats mounted on said levers adapted to engage the hollow rivet elements at the outlet of said feed device, a stationary cam surface opposite said outlet, cam followers on said levers adapted to successively engage said cam surface for lifting said teats from said plate above the rivet elements in said feed device and to recede thereafter from said cam surface, means for biasing said teats toward said plate, a projection on said setting tool adapted to be successively engaged by said levers and adapted to lift said teats and to release said rivets above said setting tool.

44. A rivet setting machine as claimed in claim 15, which further comprises stop means for said movable frame, and resilient means in said movable frame actuating means for holding said movable frame against said stop means during a portion of the stroke of said tool actuating means.

45. In a rivet setting machine, a movable frame a fixed frame, punching tools carried by said movable frame and setting tools carried by said fixed frame, a common actuating member for said tools, an anvil, a toggle lever for actuating said actuating member and said anvil, control means for the machine, and means for connecting the apex of said toggle lever with said movable frame and said control means.

46. In a rivet setting machine, punching tools, setting tools, a movable frame for said punching tools, a fixed frame for said setting tools, means for intermittently reciprocating said movable frame, means for alternatively operating said punching and setting tools in the respective ends of the stroke of said movable frame, and means for holding the work stationary during one stroke of the reciprocation of said movable frame.

47. In a rivet setting machine as claimed in claim 46, means for releasing said holding means during the other stroke of the reciprocation of said movable frame, and work feeding means operative during that portion of the reciprocation of said movable frame.

JEAN GOBIN DIT DAUDÉ.